PDF (12) United States Patent
Adibi

(10) Patent No.: US 8,510,104 B2
(45) Date of Patent: *Aug. 13, 2013

(54) SYSTEM AND METHOD FOR LOW OVERHEAD FREQUENCY DOMAIN VOICE AUTHENTICATION

(75) Inventor: Sasan Adibi, Kitchener (CA)

(73) Assignee: Research In Motion Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/617,151

(22) Filed: Sep. 14, 2012

(65) Prior Publication Data

US 2013/0013309 A1 Jan. 10, 2013

Related U.S. Application Data

(63) Continuation of application No. 12/615,801, filed on Nov. 10, 2009, now Pat. No. 8,321,209.

(51) Int. Cl.
G01L 17/00 (2006.01)
G01L 19/02 (2006.01)

(52) U.S. Cl.
USPC ............................ 704/205; 704/224; 704/246

(58) Field of Classification Search
USPC ................. 704/224, 231, 243, 246, 250, 273, 704/205, 206
See application file for complete search history.

(56) References Cited

U.S. PATENT DOCUMENTS 3,700,815 A * 10/1972 Doddington et al. ......... 704/246
3,770,891 A * 11/1973 Kalfaian ....................... 704/250
4,039,754 A * 8/1977 Lokerson ...................... 704/230
4,284,846 A 8/1981 Marley
4,707,857 A 11/1987 Marley et al.
4,829,572 A 5/1989 Kong
5,056,150 A 10/1991 Yu et al.

(Continued)

FOREIGN PATENT DOCUMENTS

EP 1950736 A 7/2008

OTHER PUBLICATIONS

Monrose, F. et al.; "Cryptographic Key Generation from Voice"; In Proceedings of the 2001 IEEE Symposium on Security and Privacy; May 2001;Available from http://cs.unc.edu/.about.fabian/papers/oakland.pdf.

(Continued)

Primary Examiner — Martin Lerner
(74) Attorney, Agent, or Firm — Blake, Cassels & Graydon LLP; Wilfred P. So; Brett J. Slaney

(57) ABSTRACT

A system and method are provided to authenticate a voice in a frequency domain. A voice in the time domain is transformed to a signal in the frequency domain. The first harmonic is set to a predetermined frequency and the other harmonic components are equalized. Similarly, the amplitude of the first harmonic is set to a predetermined amplitude, and the harmonic components are also equalized. The voice signal is then filtered. The amplitudes of each of the harmonic components are then digitized into bits to form at least part of a voice ID. In another system and method, a voice is authenticated in a time domain. The initial rise time, initial fall time, second rise time, second fall time and final oscillation time are digitized into bits to form at least part of a voice ID. The voice IDs are used to authenticate a user's voice.

17 Claims, 20 Drawing Sheets

(56) References Cited

U.S. PATENT DOCUMENTS

| | | | |
|---|---|---|---|
| 5,146,539 A * | 9/1992 | Doddington et al. | 704/241 |
| 5,414,755 A | 5/1995 | Bahler et al. | |
| 5,574,823 A | 11/1996 | Hassanein et al. | |
| 5,839,099 A | 11/1998 | Munsell et al. | |
| 5,864,813 A | 1/1999 | Case | |
| 5,884,260 A | 3/1999 | Leonhard | |
| 5,974,381 A | 10/1999 | Kubota | |
| 6,393,305 B1 | 5/2002 | Ulvinen et al. | |
| 6,687,665 B1 | 2/2004 | Oda et al. | |
| 6,804,646 B1 | 10/2004 | Schneider | |
| 6,898,568 B2 * | 5/2005 | Ng et al. | 704/246 |
| 6,928,421 B2 | 8/2005 | Craig et al. | |
| 7,035,742 B2 | 4/2006 | Klefenz et al. | |
| 7,249,022 B2 | 7/2007 | Kayama et al. | |
| 7,383,184 B2 | 6/2008 | Dworzak | |
| 7,454,334 B2 * | 11/2008 | Agranat | 704/231 |
| 7,536,304 B2 | 5/2009 | Di Mambro et al. | |
| 7,580,536 B2 | 8/2009 | Carlile et al. | |
| 8,108,164 B2 | 1/2012 | Joublin et al. | |
| 8,195,317 B2 | 6/2012 | Sawashi et al. | |
| 8,321,209 B2 * | 11/2012 | Adibi | 704/205 |
| 8,326,625 B2 * | 12/2012 | Adibi | 704/246 |
| 2001/0056349 A1 * | 12/2001 | St. John | 704/270 |
| 2002/0116189 A1 | 8/2002 | Yeh et al. | |
| 2002/0128834 A1 * | 9/2002 | Fain et al. | 704/246 |
| 2003/0216907 A1 | 11/2003 | Thomas | |
| 2004/0133424 A1 | 7/2004 | Ealey et al. | |
| 2005/0171774 A1 * | 8/2005 | Applebaum et al. | 704/250 |
| 2006/0293016 A1 | 12/2006 | Giesbrecht et al. | |
| 2007/0055517 A1 | 3/2007 | Spector | |
| 2007/0100620 A1 | 5/2007 | Tavares | |
| 2007/0192100 A1 * | 8/2007 | Rosec et al. | 704/246 |
| 2007/0288232 A1 | 12/2007 | Kim | |
| 2008/0091416 A1 | 4/2008 | Kim et al. | |
| 2009/0158919 A1 | 6/2009 | Akazawa | |
| 2010/0131272 A1 * | 5/2010 | Wu | 704/243 |
| 2010/0179813 A1 | 7/2010 | Summerfield et al. | |
| 2011/0112838 A1 | 5/2011 | Adibi | |
| 2011/0153314 A1 | 6/2011 | Oxford et al. | |

OTHER PUBLICATIONS

Imperl, B. et al.; "A study of harmonic features for the speaker recognition"; Speech Communication; Sep. 1, 1997; pp. 385 to 402; Vo. 22, No.; Elsevier Science Publishers; Amsterdam, NL; ISSN: 0167-6393.

Zimmerman, Elko; Search Report from corresponding European Application No. 09175587.6; search completed Dec. 9, 2009.

Zimmerman, Elko; Search Report from corresponding European Application No. 09175597; search completed Dec. 14, 2009.

* cited by examiner

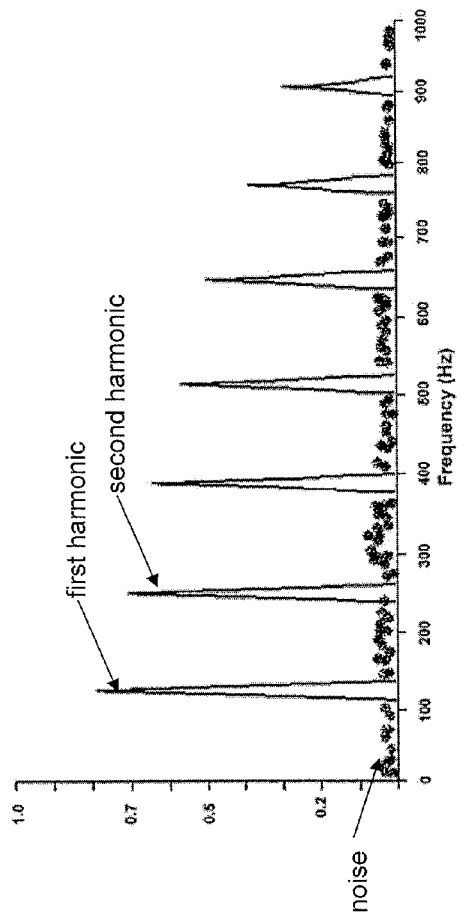
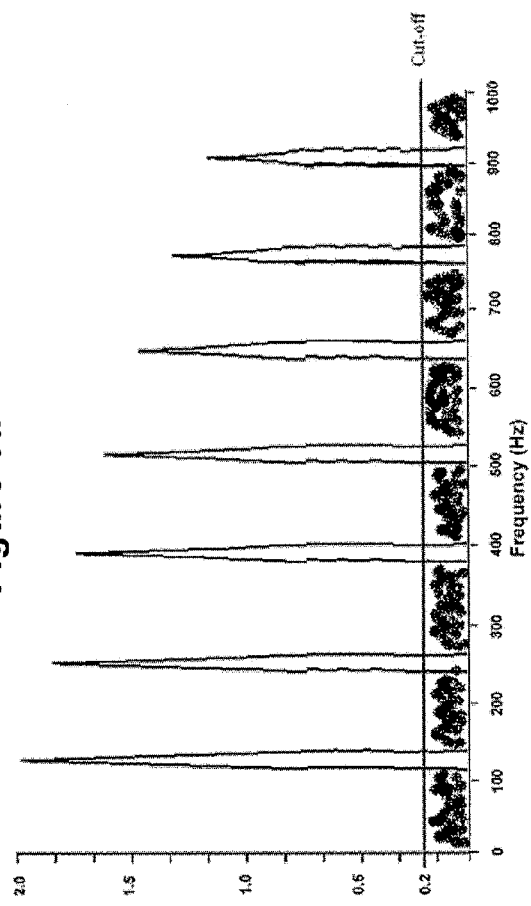
Figure 6a
Figure 6b

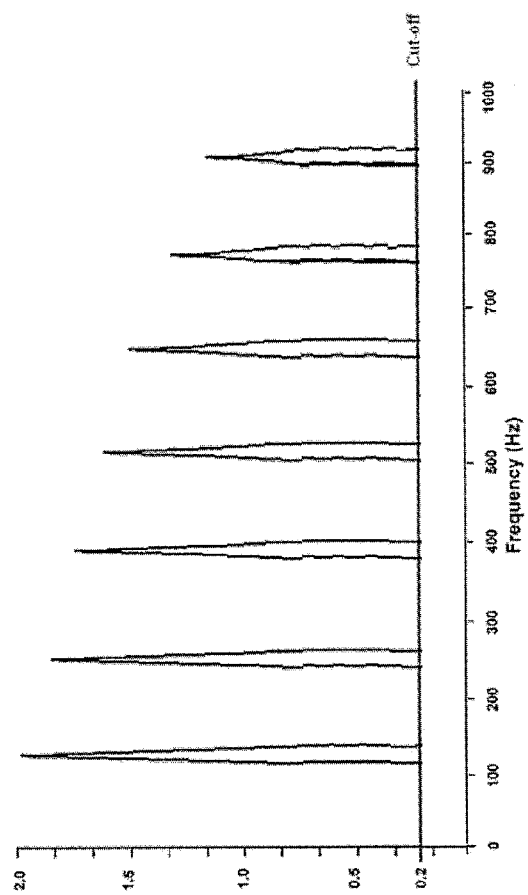
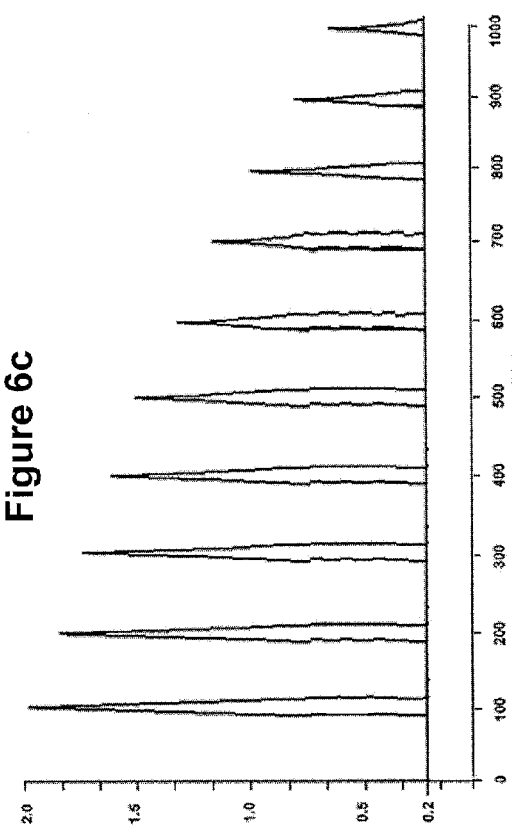
Figure 6c
Figure 6d

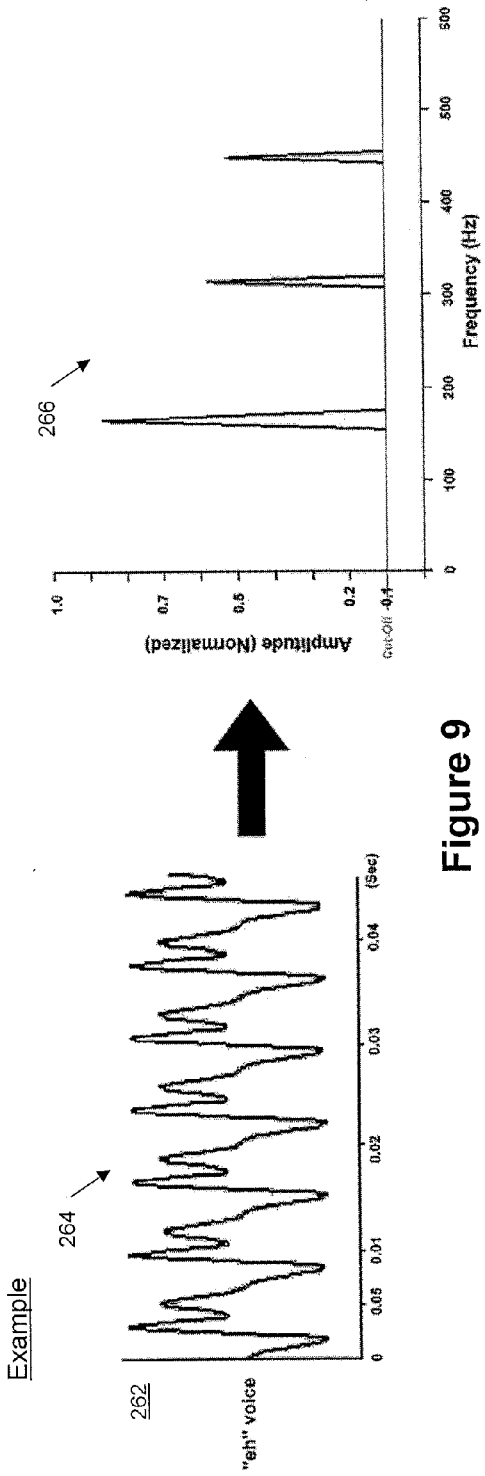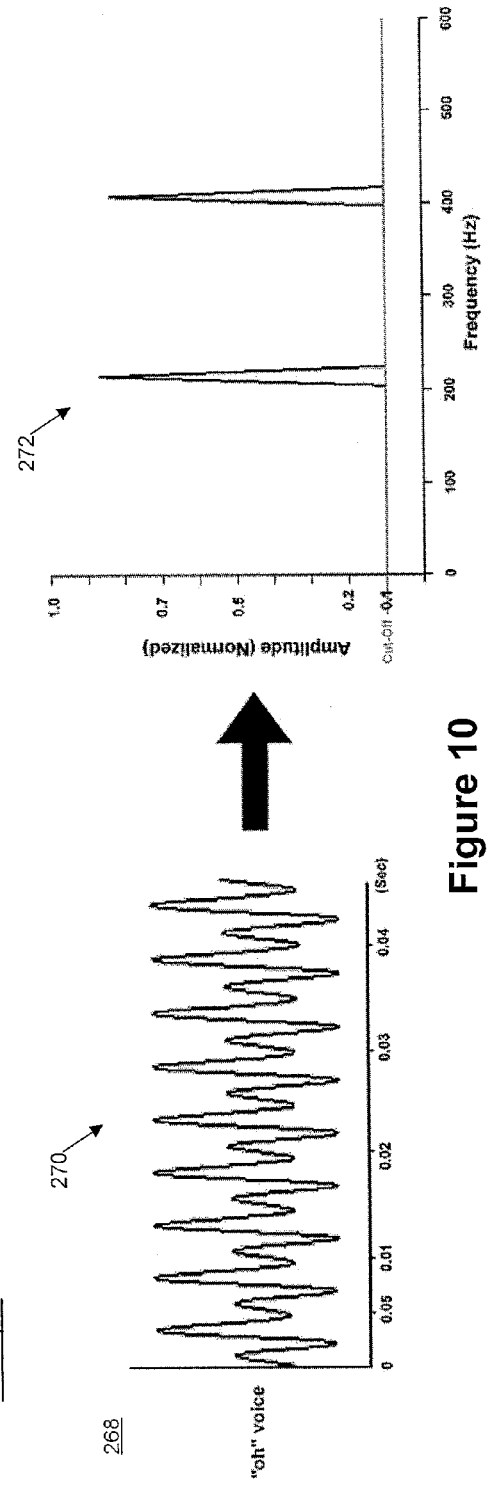

US 8,510,104 B2

SYSTEM AND METHOD FOR LOW OVERHEAD FREQUENCY DOMAIN VOICE AUTHENTICATION

CROSS-REFERENCE TO RELATED APPLICATIONS

This application is a continuation of U.S. application Ser. No. 12/615,801 filed on Nov. 10, 2009, now issued U.S. Pat. No. 8,312,209 issued Nov. 27, 2012, the contents of which are hereby incorporated by reference in their entirety.

TECHNICAL FIELD

The following relates to systems and methods for voice authentication and, in particular, low overhead voice authentication.

BACKGROUND

A person's identity can be determined using biometric features, such as their voice. In many technologies, various characteristics of a human voice are quantified and are used to distinguish one voice from another. These are commonly known as voice authentication schemes and may be applied in various environments.

The process of quantifying the human voice generally involves converting a signal associated with a voice from an analog format into a digital format, and then extracting the relevant characteristics. However, the process of extracting the relevant characteristics from the voice typically requires a relatively large amount of computing resources. It may also be difficult to extract the relevant characteristics for the purpose of recognizing a person's voice since the person's voice may change over time, or in different environments. Further, the quantification of the human voice may often result in a large data representation.

BRIEF DESCRIPTION OF THE DRAWINGS

Embodiments will now be described by way of example only with reference to the appended drawings wherein:

FIGS. 6a, 6b, 6c and 6d are exemplary graphs showing the various stages of a voice signal in the frequency domain according the process shown in FIG. 5.

FIG. 9 is an exemplary illustration of a time domain graph and a frequency domain graph for the vocal sound "eh".

FIG. 10 is an exemplary illustration of a time domain graph and a frequency domain graph for the vocal sound "oh".

DETAILED DESCRIPTION OF THE DRAWINGS

Figure 1:
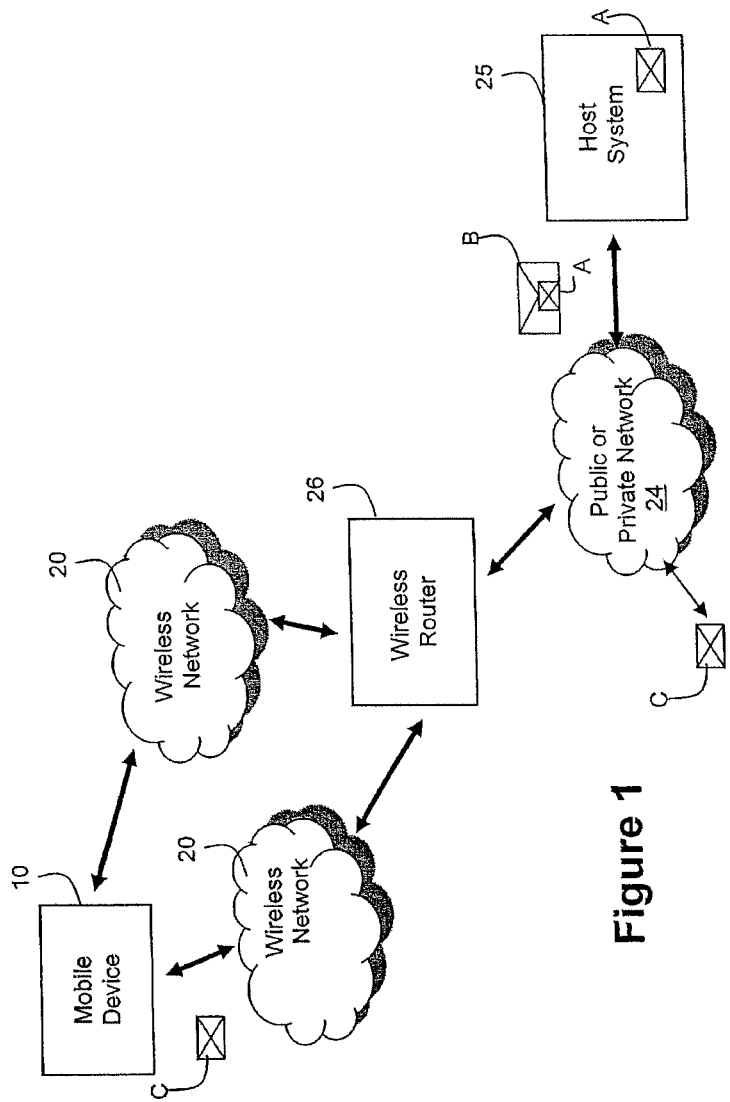
FIG. 1 is a schematic diagram illustrating a system in which data items are pushed from a host system to a mobile device.

In voice identification or authentication schemes, a user utters or speaks a sound. The sound, or voice input, is captured and certain features are extracted from the voice input which are used to identify or authenticate the user. Generally, in order to better characterize a voice, more features are extracted and thus, more data is required to represent such features. This process can strain computing resources where computing resources may be constrained or limited, for example on a mobile device, and can increase processing time. Moreover, it has been realized that it is difficult to distinguish a user's voice given that the user's voice may change in different circumstances. For example, in a loud or noisy setting, a user may speak louder and in a lower tone of voice. However, in a quiet setting, the same user may speak in quieter or softer voice, such as a whisper, and in a higher pitch. It can thus be understood that it is desirable to identify or authenticate the same voice under different volumes and intonations, and to do the same while lowering the amount of required computer resources.

In the following, a method and system are provided to generate a voice identification, also referred to as a voice ID in the frequency domain. The originating voice signal is captured in the time domain and is converted to the frequency domain. The frequency and amplitude of the first harmonic are set to pre-determined values, and the other harmonic components are adjusted accordingly to maintain a relative gain to the first harmonic. Amplitude and frequency filters are applied to the signal. Then, the amplitude of each harmonic is digitized, as well as the number of harmonics. The digital representation of the amplitude of each harmonic and the number of harmonics is concatenated to form a voice ID.

In one embodiment of a method for generating a voice identification in a frequency domain, one or more periods of a voice signal are transformed from a time domain to the frequency domain. Then the amplitude of a first harmonic in the voice signal is set to a predetermined amplitude and the amplitudes of one or more other harmonics are adjusted to maintain relative gain to the first harmonic. The frequency of the first harmonic of the transformed voice signal is set to a predetermined frequency. Similarly, the frequency of one or more other harmonics are adjusted to maintain the harmonic series relative to the first harmonic. Another one or more frequency components that are above a predetermined harmonic are removed from the transformed voice signal. Then, the amplitudes of each of the remaining harmonics in the transformed voice signal are digitized into a first predetermined number of bits, and the number of harmonics are digitized into a second number of bits. The bits are concatenated to form the voice identification.

The method for generating the voice identification in the frequency domain further includes removing one or more frequency components having an amplitude of less than a first predetermined percentage of the predetermined amplitude, at least before digitizing each of the remaining harmonics and digitizing the number of harmonics. Further, other frequency components that are not centered within a second predetermined percentage of the frequency of each harmonic are removed or filtered out. It can be appreciated that a discrete Fourier transform or a fast Fourier transform is used to transform the one or more periods of a voice signal from the time domain to the frequency domain. In another aspect, the voice signal is recorded from a user uttering at least one of several pre-determined sounds, includes any one of "oh", "aa", "eh" or "ee", or combinations thereof. These predetermined sounds are identified by a third number of bits, which can be concatenated to form part of the voice identification. It can also be appreciated that the first harmonic's original amplitude and frequency may be digitized into a fourth number of bits, which may also be concatenated to the voice identification. As a check on the quality of the data, if the number of harmonics are less than a predetermined threshold, then the method for generating the voice identification is restarted using a new voice signal.

In another approach, a method and system are provided to generate a voice ID in the time domain. The originating voice signal is captured in the time domain and is segmented into five separate time pieces or portions, which include the Initial Rise Time (IRT), Initial Fall Time (IFT), Second Rise Time (SRT), Second Fall Time (SFT), and Final Oscillation Time (FOT). The amplitude and time period of each of the highest amplitude (e.g. the IRT) are set to pre-determined values, and the other time pieces are adjusted accordingly to maintain a relative gain to the first time piece. Then the time periods of each of the time pieces are digitized, whereby the digital representation of each time period is concatenated to form a voice ID.

In one embodiment of a method for generating a voice identification in a time domain, time portions of a voice signal are identified, namely an IRT portion, an IFT portion, an SRT portion, an SFT portion and an FOT portion, whereby the time portions form a period of the voice signal. The time value or duration of each of the time portions are measured, and then digitized into a first predetermined number of bits. The bits are concatenated to form the voice identification.

The method for generating the voice identification in the time domain further includes setting the time value of the period to a predetermined time and adjusting the time value for each of the time portions to fit within the predetermined time while maintaining the relative time value between the time portions. This is done at least before digitizing the time value of each of the time portions. In another aspect, the amplitude of several peaks are measured, whereby a first peak is defined by the IRT and the IFT, a second peak is defined by the IFT and the SRT, a third peak is defined by the SRT and the SFT, and a fourth peak is defined by the SFT and the FOT.

Then, the amplitude of the first peak is set to a predetermined voltage and the amplitudes of the second, third and fourth peaks are adjusted to maintain a relative gain to the first peak. The amplitudes of each of the second, third and fourth peaks are digitized into a second predetermined number of bits, which are concatenated to the voice identification. In another aspect, the voice signal is recorded from a user uttering at least one of several pre-determined sounds, includes any one of "oh", "aa", "eh" or "ee", or combinations thereof. These predetermined sounds are identified by a third number of bits, which can be concatenated to form part of the voice identification.

The following examples include communications between mobile or handheld devices, which will be commonly referred to as mobile devices hereinafter and referred to by numeral 10.

The mobile device 10 can be a two-way communication device with advanced data communication capabilities including the capability to communicate with other mobile devices 10 or computer systems through a network of transceiver stations. The mobile device 10 may also have the capability to allow voice communication. Depending on the functionality provided by the mobile device 10, it may be referred to as a data messaging device, a two-way pager, a cellular telephone with data messaging capabilities, a wireless Internet appliance, or a data communication device (with or without telephony capabilities). The mobile device 10 can also be one that is used in a system that is configured for continuously routing all forms of pushed information from a host system 25 to the mobile device 10. One example of such a system will now be described making reference to FIG. 1.

FIG. 1 is an example system diagram showing the redirection of user data items (such as message A or C) from a corporate enterprise computer system (host system) 25 to the user's mobile device 10 via a wireless router 26. The wireless router 26 provides the wireless connectivity functionality as it acts to both abstract most of the wireless network's 20 complexities, and it also implements features necessary to support pushing data to the mobile device 10. Although not shown, a plurality of mobile devices may access data from the host system 25. In this example, message A in FIG. 1 represents an internal message sent from, e.g. a desktop computer (not shown) within the host system 25, to any number of server computers in the corporate network (e.g. LAN), which may, in general, include a database server, a calendar server, an E-mail server or a voice-mail server.

Message C in FIG. 1 represents an external message from a sender that is not directly connected to the host system 25, such as the user's mobile device 10, some other user's mobile device (not shown), or any user connected to the public or private network 24 (e.g. the Internet). Message C could be e-mail, voice-mail, calendar information, database updates, web-page updates or could even represent a command message from the user's mobile device 10 to the host system 25. The host system 25 may comprise, along with the typical communication links, hardware and software associated with a corporate enterprise computer network system, one or more wireless mobility agents, a TCP/IP connection, a collection of data stores, (for example a data store for e-mail could be an off-the-shelf mail server like Microsoft Exchange® Server or Lotus Notes® Server), all within and behind a corporate firewall.

The mobile device 10 may be adapted for communication within wireless network 20 via wireless links, as required by each wireless network 20 being used. As an illustrative example of the operation for a wireless router 26 shown in FIG. 1, consider a data item A, repackaged in outer envelope B (the packaged data item A now referred to as "data item (A)") and sent to the mobile device 10 from an Application Service Provider (ASP) in the host system 25. Within the ASP is a computer program, similar to a wireless mobility agent, running on any computer in the ASP's environment that is sending requested data items from a data store to a mobile device 10. The mobile-destined data item (A) is routed through the network 24, and through the wireless router's 26 firewall protecting the wireless router 26 (not shown).

Although the above describes the host system 25 as being used within a corporate enterprise network environment, this is just one embodiment of one type of host service that offers push-based messages for a handheld wireless device that is capable of notifying and presenting the data to the user in real-time at the mobile device when data arrives at the host system.

By offering a wireless router 26 (sometimes referred to as a "relay", "message server", "data redirector", etc.), there are a number of major advantages to both the host system 25 and the wireless network 20. The host system 25 in general runs a host service that is considered to be any computer program that is running on one or more computer systems. The host service is said to be running on a host system 25, and one host system 25 can support any number of host services. A host service may or may not be aware of the fact that information is being channelled to mobile devices 10. For example an e-mail or message program 138 (see FIG. 2) might be receiving and processing e-mail while an associated program (e.g. an e-mail wireless mobility agent) is also monitoring the mailbox for the user and forwarding or pushing the same e-mail to a wireless device 10. A host service might also be modified to prepare and exchange information with mobile devices 10 via the wireless router 26, like customer relationship management software. In a third example, there might be a common access to a range of host services. For example a mobility agent might offer a Wireless Access Protocol (WAP) connection to several databases.

Although the system is exemplified as operating in a two-way communications mode, certain aspects of the system could be used in a "one and one-half" or acknowledgment paging environment, or even with a one-way paging system. In such limited data messaging environments, the wireless router 26 still could abstract the mobile device 10 and wireless network 20, offer push services to standard web-based server systems and allow a host service in a host system 25 to reach the mobile device 10 in many countries.

The host system 25 shown herein can have many methods when establishing a communication link to the wireless router 26. For one skilled in the art of data communications the host system 25 could use connection protocols like TCP/IP, X.25, Frame Relay, ISDN, ATM or many other protocols to establish a point-to-point connection. Over this connection there are several tunnelling methods available to package and send the data, some of these include: HTTP/HTML, HTTP/XML, HTTP/Proprietary, FTP, SMTP or some other proprietary data exchange protocol. The type of host systems 25 that might employ the wireless router 26 to perform push could include: field service applications, e-mail services, stock quote services, banking services, stock trading services, field sales applications, advertising messages and many others. This wireless network 20 abstraction is made possible by the wireless router 26, which implements this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 25, or that the host system 25 acquires through the use of intelligent agents, such as data that is received after the host system 25 initiates a search of a database or a website or a bulletin board.

The wireless router 26 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the existing and upcoming third-generation (3G) and fourth generation (4G) networks like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 25, the wireless router 26 may implement a set of defined functions. It can be appreciated that one could select many different hardware configurations for the wireless router 26, however, many of the same or similar set of features would likely be present in the different configurations.

Figure 2:
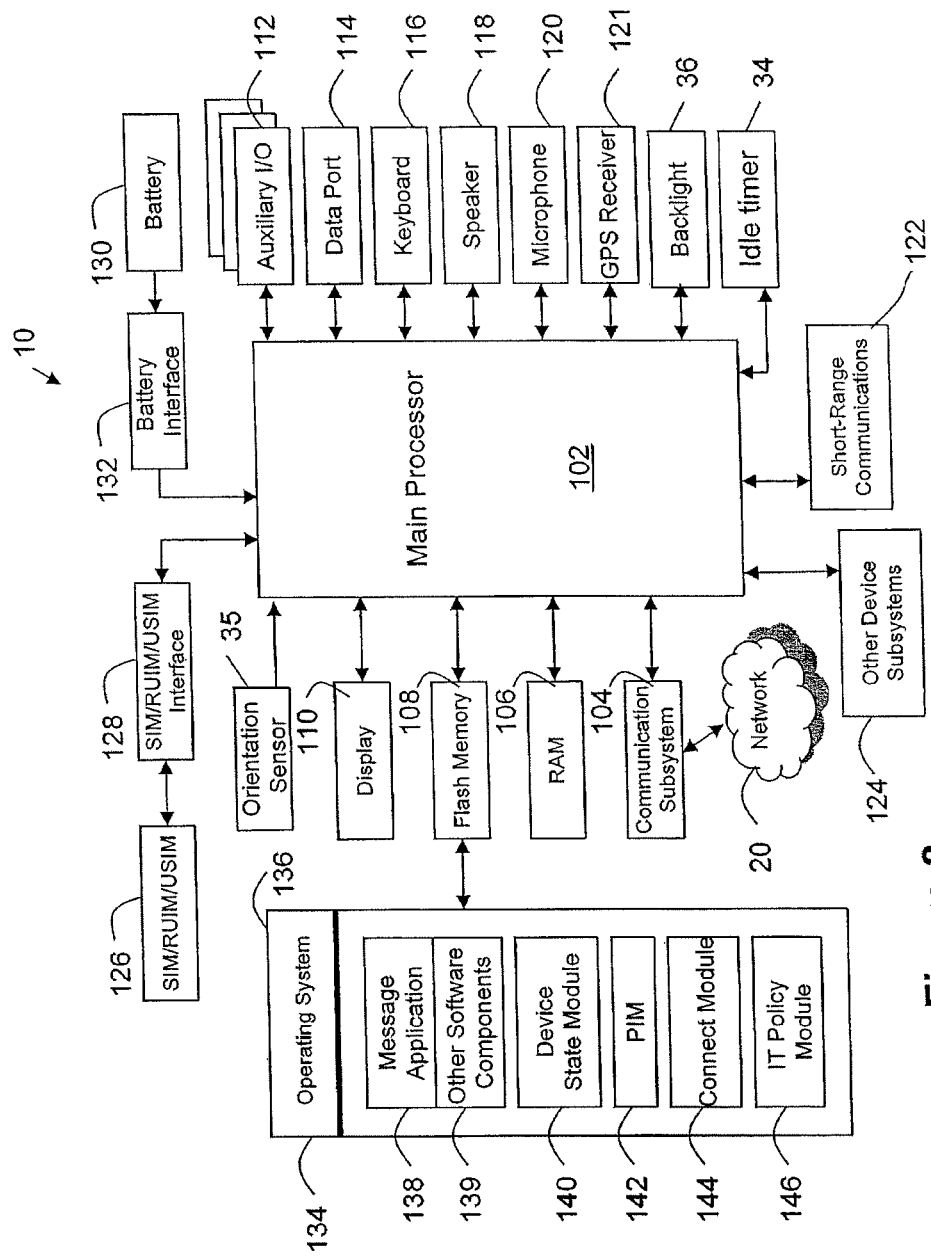
FIG. 2 is a block diagram of an exemplary embodiment of a mobile device.
Figure 3:
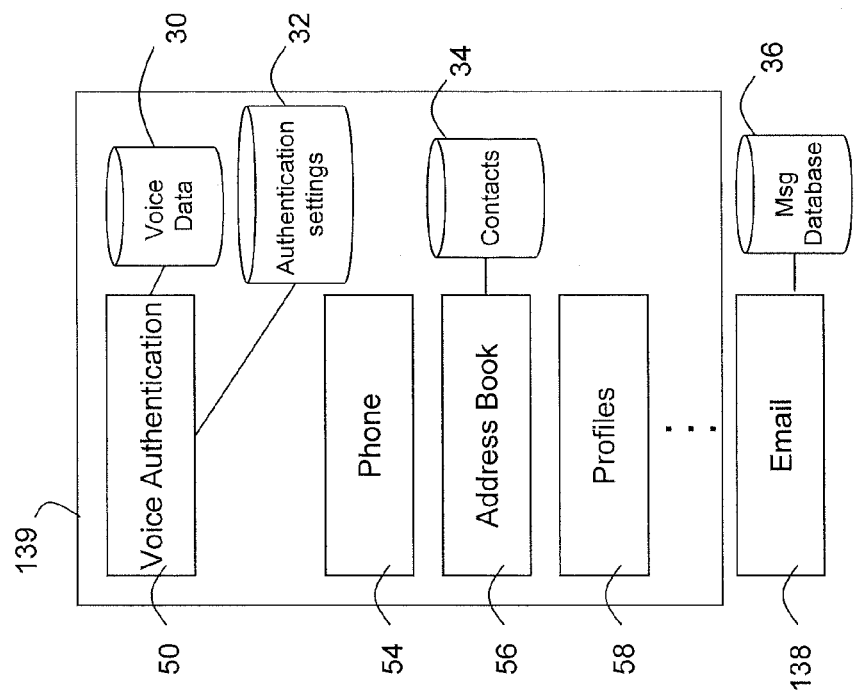
FIG. 3 is a block diagram illustrating exemplary ones of the other software applications and components shown in FIG. 2.

An exemplary configuration for the mobile device 10 is illustrated in FIGS. 2-3. Referring first to FIG. 2, shown therein is a block diagram of an exemplary embodiment of a mobile device 10. The mobile device 10 comprises a number of components such as a main processor 102 that controls the overall operation of the mobile device 10. Communication functions, including data and voice communications, are performed through a communication subsystem 104. The communication subsystem 104 receives messages from and sends messages to a wireless network 20. In this exemplary embodiment of the mobile device 10, the communication subsystem 104 is configured in accordance with the GSM and GPRS standards, which are used worldwide. Other communication configurations that are equally applicable are the 3G and 4G networks discussed above. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 20 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124. As will be discussed below, the short-range communications 122 can implement any suitable or desirable device-to-device or peer-to-peer communications protocol capable of communicating at a relatively short range, e.g. directly from one device to another. Examples include Bluetooth®, ad-hoc WiFi, infrared, or any "long-range" protocol re-configured to utilize available short-range components. It will therefore be appreciated that short-range communications 122 may represent any hardware, software or combination of both that enable a communication protocol to be implemented between devices or entities in a short range scenario, such protocol being standard or proprietary.

Some of the subsystems of the mobile device 10 perform communication-related functions, whereas other subsystems may provide "resident" or on-device functions. By way of example, the display 110 and the keyboard 116 may be used for both communication-related functions, such as entering a text message for transmission over the network 20, and device-resident functions such as a calculator or task list.

The mobile device 10 can send and receive communication signals over the wireless network 20 after required network registration or activation procedures have been completed. Network access is associated with a subscriber or user of the mobile device 10. To identify a subscriber, the mobile device 10 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 10 is not fully operational for communication with the wireless network 20. Once the SIM/RUIM/USIM 126 is inserted into the SIM/RUIM/USIM interface 128, it is coupled to the main processor 102.

The mobile device 10 is typically a battery-powered device and in this example includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Software applications may include a message application 138, a device state module 140, a Personal Information Manager (PIM) 142, a connect module 144 and an IT policy module 146. A message application 138 can be any suitable software program that allows a user of the mobile device 10 to send and receive electronic messages, wherein messages are typically stored in the flash memory 108 of the mobile device 10. A device state module 140 provides persistence, i.e. the device state module 140 ensures that important device data is stored in persistent memory, such as the flash memory 108, so that the data is not lost when the mobile device 10 is turned off or loses power. A PIM 142 includes functionality for organizing and managing data items of interest to the user, such as, but not limited to, e-mail, text messages, instant messages, contacts, calendar events, and voice mails, and may interact with the wireless network 20. A connect module 144 implements the communication protocols that are required for the mobile device 10 to communicate with the wireless infrastructure and any host system 25, such as an enterprise system, that the mobile device 10 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc. The additional applications 139 can be loaded onto the mobile device 10 through at least one of the wireless network 20, the auxiliary I/O subsystem 112, the data port 114, the short-range communications subsystem 122, or any other suitable device subsystem 124.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

The main processor 102 can also control a backlight 36 for conserving battery life when the mobile device 10 is locked or otherwise not in use (e.g. in a holster). The backlight 36 can be used to illuminate the display 110 when the mobile device 10 is being used. The backlight 36 can be associated with an idle timer 34 such that an idle time can be tracked and if it reaches or exceeds a certain predetermined threshold (or user definable threshold), the backlight 36 is turned off. As will be explained below, the idle timer 34 can also be used to provide a current idle time to the main processor 102 for other uses such as to determine inactivity of the user. The main processor 102 may also utilize data provided by an orientation sensor 35. The orientation sensor 35 may comprise an inclinometer or other sensor capable of determining the orientation of the mobile device 10 with respect to a datum.

For composing data items, such as e-mail messages, for example, a user or subscriber could use a touch-sensitive overlay (not shown) on the display 110 that is part of a touch screen display (not shown), in addition to possibly the auxiliary I/O subsystem 112. The auxiliary I/O subsystem 112 may include devices such as: a mouse, track ball, infrared fingerprint detector, or a roller wheel with dynamic button pressing capability. A composed item may be transmitted over the wireless network 20 through the communication subsystem 104.

FIG. 3 shows an example of the other software applications and components 139 that may be stored on and used with the mobile device 10. Only examples are shown in FIG. 3 and such examples are not to be considered exhaustive. In this example, a voice authentication module or application 50, phone application 54, address book 56 and a profiles application 58 are shown to illustrate the various features that may be provided by the mobile device 10. Also shown in FIG. 3 is the message application 138, which in the following will be referred to as an email application 138 for clarity and stores or otherwise has access to a message database 36 for storing incoming and outgoing messages as well as those stored in various folders. It will be appreciated that the various applications may operate independently or may utilize features of other applications. For example, the phone application 54 and email application 138 may use the address book 56 for contact details obtained from a list of contacts 34.

The voice authentication application 50 processes voice data and uses the processed voice data to authenticate or identify a user, among other things. A voice data database 30 is provided to store unprocessed or processed voice data, or both, which has been collected or generated during voice authentication schemes. An authentication settings database 32 stores the various parameters used for carrying out the voice authentication schemes in the voice authentication application 50.

Figure 4:
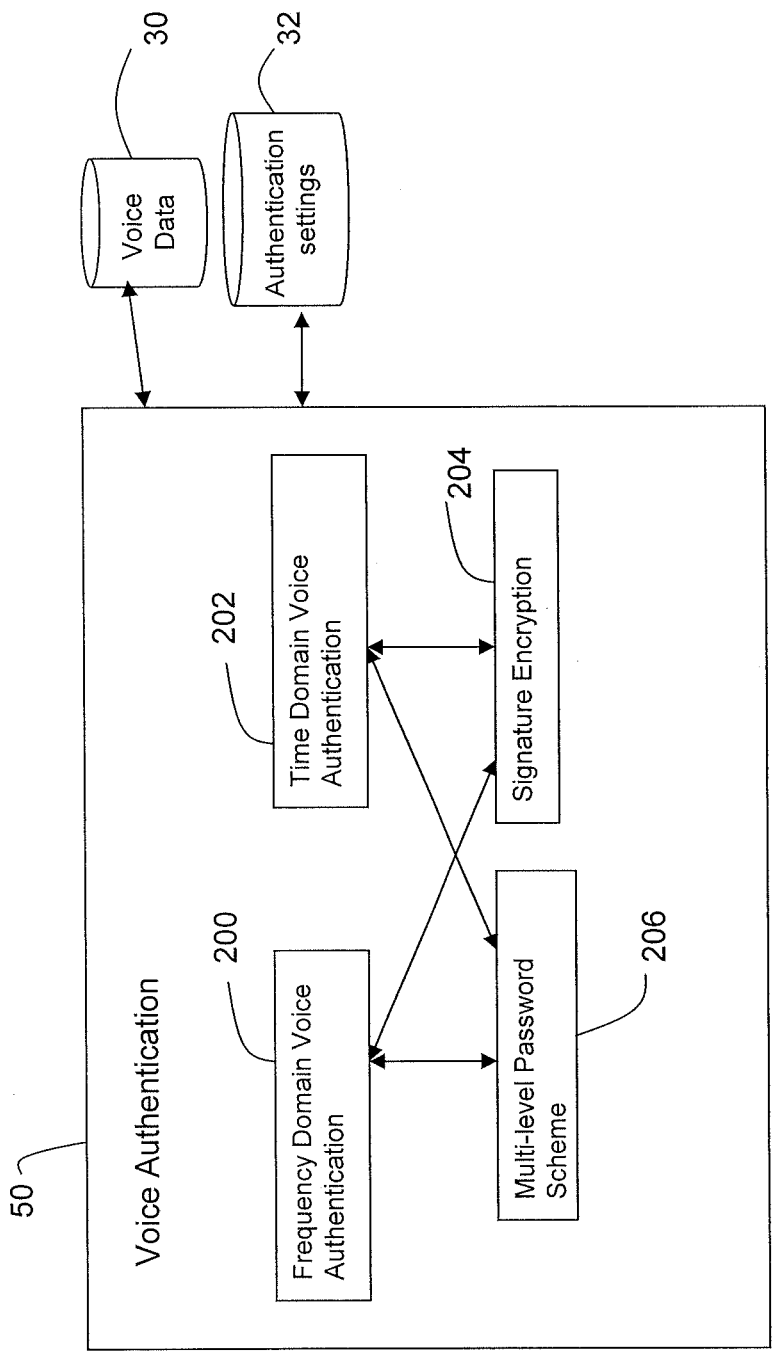
FIG. 4 is a block diagram illustrating exemplary ones of the voice authentication components shown in FIG. 3.

Turning to FIG. 4, a number of voice authentication schemes or components of the voice authentication application 50 are illustrated. A frequency domain voice authentication scheme 200 and a time domain authentication scheme 202 are two separate approaches to generating a voice ID from the input voice signal. In both approaches 200, 202, the voice ID can be used to authenticate a user's voice. The generated voice ID from each approach 200, 202 can also be used in various other schemes such as, for example, a multi-level password scheme 206 and a signature encryption scheme 204. Details describing each of the above schemes or components are described further below.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10 or accessible or connectable thereto. Any application or module herein described may be implemented using computer readable/executable instructions that may be stored or otherwise held by such computer readable media.

Generally, when a user speaks, the sound of the user's voice is captured by the microphone 120, which converts the sound vibrations into an electrical signal. In typical digital applications, the electrical signal is sampled periodically by an analog-to-digital converter to produce a sequence of values (e.g. amplitudes) as a function of time. Thus, at this stage, the user's voice is represented in the time domain. In some processes, the voice signal is transformed from the time domain to the frequency domain to measure different aspects, such as frequency.

Figure 5:
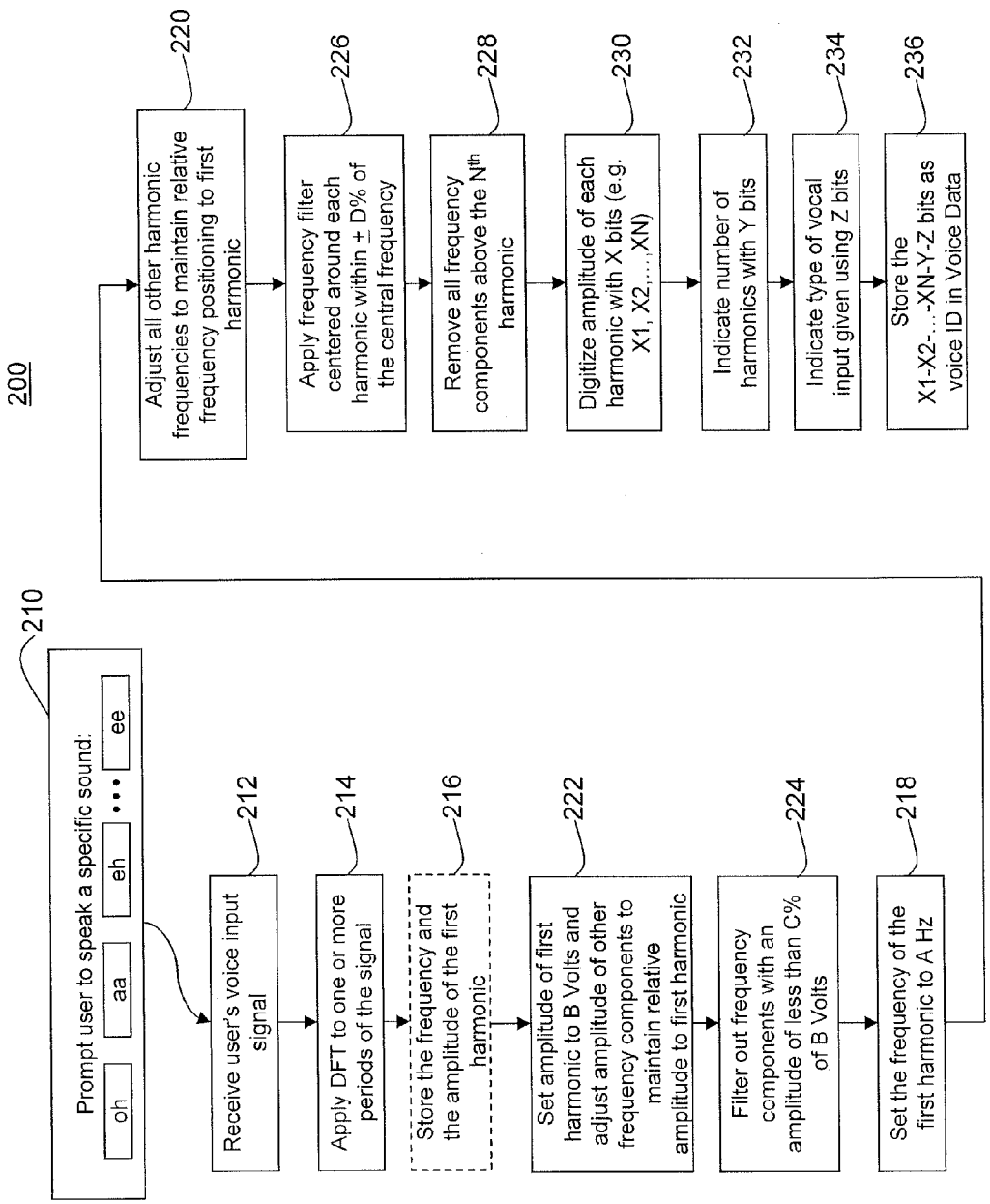
FIG. 5 is a flow chart illustrating exemplary computer executable instructions for generating a voice ID in the frequency domain.

Turning to FIG. 5, a method is provided for voice authentication scheme in the frequency domain 200. At block 210 the voice authentication module 50 prompts the user to speak a specific sound, such as any one of "oh", "aa", "eh" or "ee". These sounds are tonal and are thus easier to process. However, it can be appreciated that other sounds or combination of sounds are equally applicable to the principles described herein. The prompts may be in the form of a graphical user interface (GUI) on the display 110 which shows the particular sound the user is prompted to speak or utter. In the alternative or in combination, the prompt may also be in an audio form, whereby the mobile device 10 uses the speaker 118 to announce a prompt for the user to speak or utter a particular sound. At block 212, the mobile device 10 receives the user's voice input. As the voice input is in the time domain, it is converted to the frequency domain at step 214. In particular a discrete Fourier transform (DFT) is used to transform one or more periods of the voice input into the frequency domain. Typically, the more periods sampled and converted into the frequency domain, the more accurate the frequency domain representation of the voice. In a general sense, the DFT decomposes the sequence of values, for example in the time domain, into components of different frequencies. In one embodiment, a fast Fourier transform (FFT) is used to more efficiently compute the DFT. Once the voice input signal in the time domain has been transformed into its frequency domain representation, at block 216, the unprocessed frequency and amplitude of the first harmonic is stored in the voice data database 30. Block 216 is optional as indicated by the dotted lines, since the unprocessed frequency and amplitude is not required to compute or determine the voice ID. However, the unprocessed data may be useful for data collection, whereby trends and correlations in the voice are analyzed.

It can be appreciated that a harmonic is, in a general sense, a frequency component of a signal that is an integer multiple of the fundamental frequency, which is the lowest frequency. For example, if the fundamental frequency is f, the harmonics have frequencies f, 2f, 3f, 4f, etc.

At block 222, the frequency domain voice authentication scheme 200 sets the amplitude of the first harmonic to a pre-determined B Volts and adjusts the amplitude of the other frequency components to maintain a relative amplitude (e.g. gain) to the first harmonic. For example, if the first harmonic is 4 Volts and the second harmonic is 2 Volts, when the first harmonic is set to B Volts, the second harmonic is set to 0.5*B Volts to maintain the relative amplitude gain. Block 222 advantageously reduces the variation in the volume of the user's input voice signal. For example, the user may speak loudly (e.g. a high amplitude) in one instance and, in another instance, speak quietly (e.g. a low amplitude). Setting the amplitudes of the first harmonic to a predetermined level and adjusting the amplitudes of the other frequency components accordingly allows for the user's voice to be authenticated in both instances.

At block 224, the mobile device 10 filters out the frequency components with an amplitude of less than C % of B Volts.

Continuing with FIG. 5, at block 218, the first harmonic, or fundamental harmonic, is shifted from its current frequency to a predetermined frequency setting A Hz. The other harmonic components are shifted accordingly to maintain relative frequency positioning in the harmonic series, as per block 220. In particular, the second harmonic, third harmonic, fourth harmonic, etc. are shifted to 2A Hz, 3A Hz, 4A Hz, etc., respectively. Shifting the frequencies to a predetermined frequency setting advantageously reduces variations in the pitch of the user's voice. For example, in one instance, the user may utter a tonal sound in a higher pitch voice, while in another instance, the user may utter the same tonal sound in a lower pitch voice. Blocks 218 and 220 allow the user's voice to be authenticated in both instances.

At block 226, a frequency filter that is centered around each harmonic within ±D % of the central frequency is applied. For example, for the first harmonic, frequencies greater than A+(D % of A) Hz and frequencies less than A−(D % of A) Hz are filtered out of the signal. Similarly for the second harmonic, frequencies greater than 2A+(D % of 2A) Hz and frequencies less than 2A−(D % of 2A) Hz are filtered out of the signal. At block 228, all frequency components above the $N^{th}$ harmonic are filtered out. For example, frequencies above N*A Hz are filtered out of the signal. It can be understood that blocks 224, 226 and 228 filter out data components that are considered noise, which are perceived to have little or no value in characterizing the user's voice.

At block 230, the amplitude of each of the harmonic components of the filtered or remaining voice signal is digitized into X bits. For example, the amplitude of the first harmonic (e.g. B Volts) is digitized into X bits, the amplitude of the second harmonic is digitized into X bits, and so forth with other harmonic components. In this way, for N harmonics, the amplitudes of the entire set of harmonics is represented by a total of N*X bits. This can be represented by $X_1$ bits for the first harmonic, $X_2$ bits for the second harmonic, and up to $X_N$ bits for the Nth harmonic. It can be appreciated that the digitization process may be a conversion from a decimal format to a binary representation.

At block 232, the number of harmonic components present are represented with Y bits. It can be appreciated that the range of the number of harmonic components is between one and N harmonics.

At block 234, the type of vocal tone or sound recorded is also represented by Z bits. It can be appreciated that the higher number of different vocal tones or sounds that are recognized by the frequency domain voice authentication scheme 200, the larger the Z bits must be to accommodate. For example, if there are only four tones (e.g. "oh", "aa", "eh", and "ee"), then only two bits are required to represent the four possible tones.

After the relevant data is digitized or represented as bits, the bits of data are concatenated to form the following: $X_1$-$X_2$- . . . -$X_N$-Y-Z bits as per block 236. This series of bits forms the voice ID. It can be appreciated that the order of the bits values can be rearranged, and that different orders of the bit values (e.g. Z-Y-$X_1$-$X_2$- . . . -$X_N$) are equally applicable to the principles herein. However, it is noted that the order of the bits must be known to facilitate future comparison of voice data. The generated voice ID is stored in the voice data database 30.

It can be appreciated that the order of the blocks may be arranged in various configurations to carry out the generation of the voice ID in the frequency domain. It can also be appreciated that certain of the blocks described in voice authentication schemes, both above and below, may be optional as either explicitly described or non-explicitly described. For example, certain of the blocks related to filtering the data may not be required to carry out the process of generating a voice ID.

Turning to FIGS. 6a to 6d, several example graphs of a voice signal in the frequency domain are provided to highlight the different stages of the voice authentication scheme in the frequency domain 200. FIG. 6a shows the unprocessed data of a voice signal, including the first harmonic at 130 Hz, the second harmonic at 260 Hz, and the other harmonics. The noise is also shown in the shaded regions. FIG. 6b shows that the amplitude of the first harmonic is set to 2.0 Volts and the amplitudes of the other harmonic components are also adjusted accordingly to maintain the relative gain. This was discussed earlier with respect to block 222. FIG. 6b also shows the cut-off frequency for frequency components less than 0.2 V, as discussed earlier with respect to block 224. FIG. 6c shows the resulting voice signal that has been filtered. FIG. 6d shows the shifting the first harmonic to 100 Hz, the second harmonic to 200 Hz, and so forth with the other harmonics. It is based on this processed signal in the frequency domain that a voice ID is generated.

Figure 7:
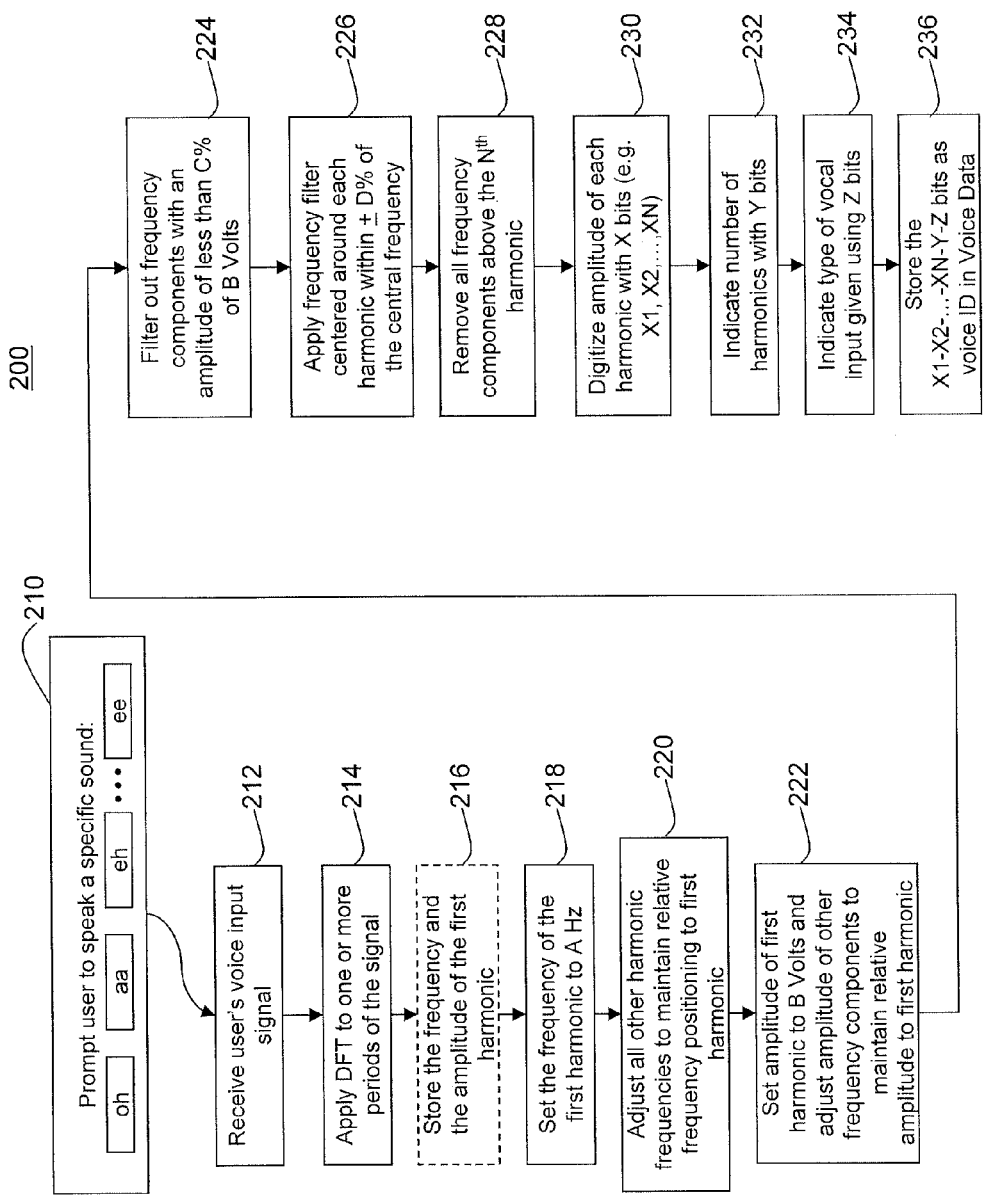
FIG. 7 is a flow chart illustrating another embodiment of exemplary computer executable instructions for generating a voice ID in the frequency domain.

FIG. 7 is another embodiment of a frequency domain voice authentication scheme 200 that is similar to the scheme 200 described with respect to FIG. 5. However, in FIG. 7, the order of certain blocks are as follows: block 218, block 220, block 222, block 224, block 226, and block 228. It can be appreciated that although the processes described in each block remain the same, the order of the blocks can be arranged in various configurations to generate a voice ID.

Figure 8:
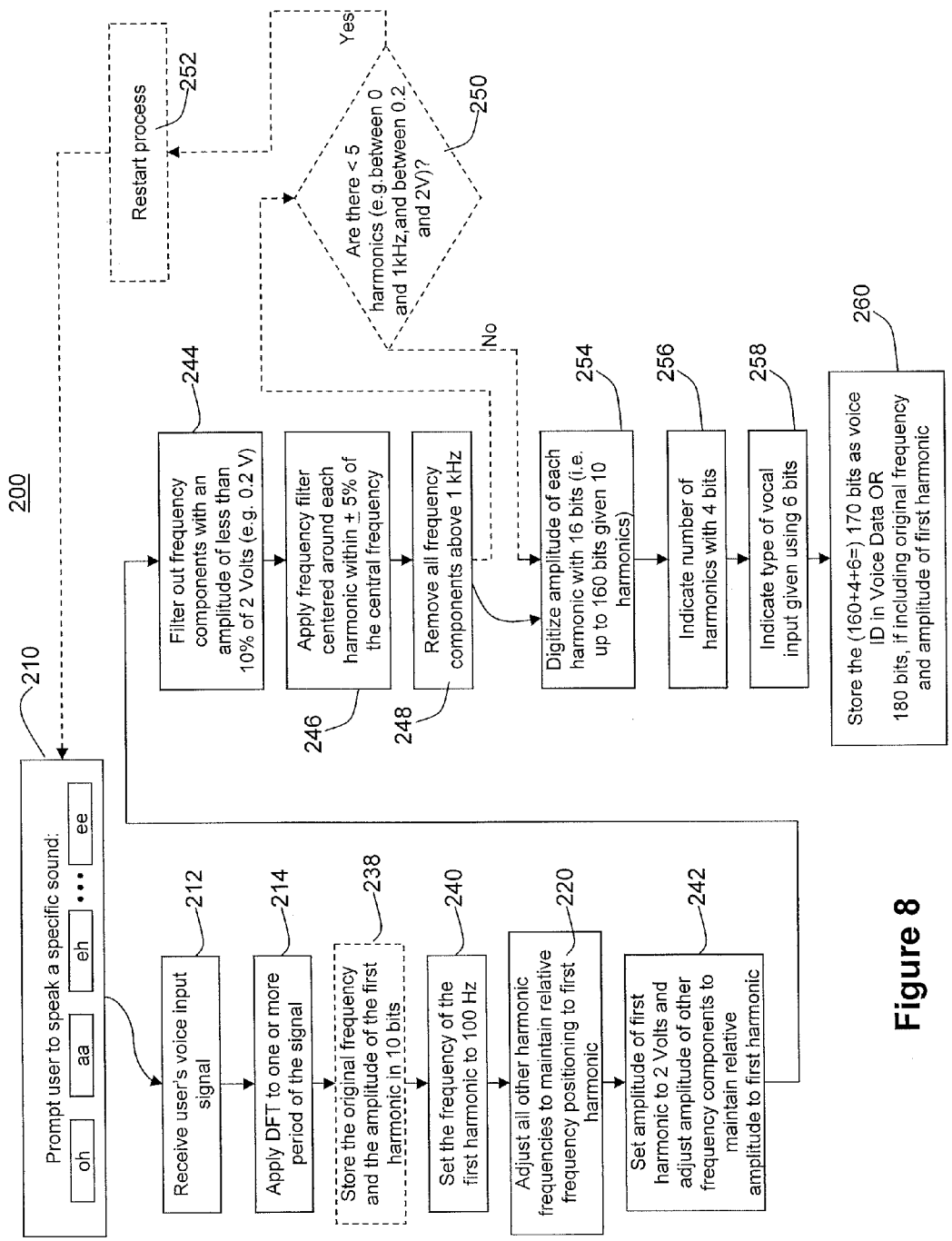
FIG. 8 is a flow chart illustrating another embodiment of generating a voice ID in the frequency domain according to the flow chart in FIG. 7.

Turning to FIG. 8, an exemplary embodiment of the frequency domain voice authentication scheme 200 is provided. Blocks 210, 212 and 214 are identical to those described with respect to FIG. 7. At block 238, which is an optional process marked in dotted lines, the original frequency and amplitude of the first harmonic is represented in 10 bits. As described earlier, this data is not required, however, can be used in other applications such as trend analysis in the voice. At block 240, the frequency of the first harmonic (e.g. fundamental frequency) is set or shifted to 100 Hz, a specified value for the parameter A Hz. Thereafter, at block 220, the frequencies of the other harmonic components are adjusted accordingly to maintain relative positioning to the first harmonic. At block 242, the amplitude of the first harmonic is set to 2 Volts, which is a specified value for the parameter B Volts. Similarly, the amplitudes of other frequency components are adjusted to maintain a relative gain to the first harmonic amplitude. At block 244, any frequency components with an amplitude of less than 10% (e.g. a specified value for parameter C %) of 2 Volts are filtered out from the signal. In other words, frequency components of less than 0.2 Volts are removed. At block 246, a frequency filtered centered around each harmonic is applied to filter out any frequency components outside the frequency range of ±5% (e.g. a specified value for parameter ±D %). At block 248, all frequencies above the $10^{th}$ harmonic (e.g. a specified value for parameter N) are filtered. In other words, frequencies above 1 kHz (e.g. 10*100 Hz) are removed.

After the signal in the frequency domain has been filtered, at block 250, which is shown in dotted lines, an optional process for determining whether sufficient data points are present in the voice signal is provided. Thus, it can be appreciated that the process can proceed directly to block 254 from block 248, or in another embodiment, the process can proceed to block 250 from block 248. At block 250, the frequency domain voice authentication scheme 200 determines if there are less than five harmonics in the filtered signal (e.g. between 0 Hz and 1 kHz, and between 0.2 V and 2.0 V). If so, then the process is restarted as per block 252. In other words, there is insufficient data to properly characterize then voice signal and the user must be prompted to input a voice signal again, as per block 210. However, if there are five or more harmonics, then the scheme 200 continues to block 254. It can be readily understood that the predetermined threshold of five harmonics can be changed to a different value. A higher predetermined threshold generally means that the captured voice data must be of a certain quality to include a required number of harmonic components.

Continuing with FIG. 8, at block 254, the amplitudes of each of the ten harmonic components are represented with 16 bits (e.g. a specified value for the parameter X bits). Thus, the concatenated bit representation of the amplitudes alone uses 160 bits. At block 256, the number of harmonics are represented using 4 bits (e.g. a specified value for the parameter Y bits). At block 258, the type of vocal sound or tone is represented using 6 bits (e.g. a specified value for parameter Z bits). It can thus be seen that, as per block 260, when the bits are concatenated, a total of 170 bits (e.g. 160+4+6 bits) are used to represent the voice ID. An additional 10 bits may be optionally concatenated to represent the original first harmonic frequency and amplitude, as per block 238, thereby forming up to 180 bits. It can thus be seen that the voice ID is represented using a low number of bits, while being sufficient to capture the characteristics of a user's voice for authentication purposes.

In view of the above, it can be seen that the parameters set out with respect to FIG. 7 are specified in the exemplary embodiment in FIG. 8. The below table maps these parameter values:

| Frequency Domain Voice Authentication Parameter | Example Value |
| --- | --- |
| A Hz | 100 Hz |
| B Volts | 2.0 Volts |
| C % (w.r.t. B Volts) | 10% |
| ±D % (w.r.t. central frequency) | 5% |
| $N^{th}$ harmonic | $10^{th}$ |
| X bits | 16 bits |
| Y bits | 4 bits |
| Z bits | 6 bits |

Other sets of parameters may also be used and adjusted according to the desired application. For example, each user may have a different set of parameter values to highlight certain characteristics of the voice. These various sets of parameters are stored in the authentication settings database 32 and can be retrieved and applied to the frequency domain voice authentication scheme 200.

Turning to FIG. 9, an example time-to-frequency domain conversion 262 is shown for a user's "eh" input voice signal. Graph 264 shows the voice signal in the time domain. Graph 266 shows the same voice signal after a DFT in the frequency domain. Similarly, in FIG. 10, an example time-to-frequency domain conversion 268 is shown for a user's "oh" input voice signal. Graph 270 shows the voice signal in the time domain. Graph 272 shows the same voice signal after a DFT in the frequency domain.

Figure 11:
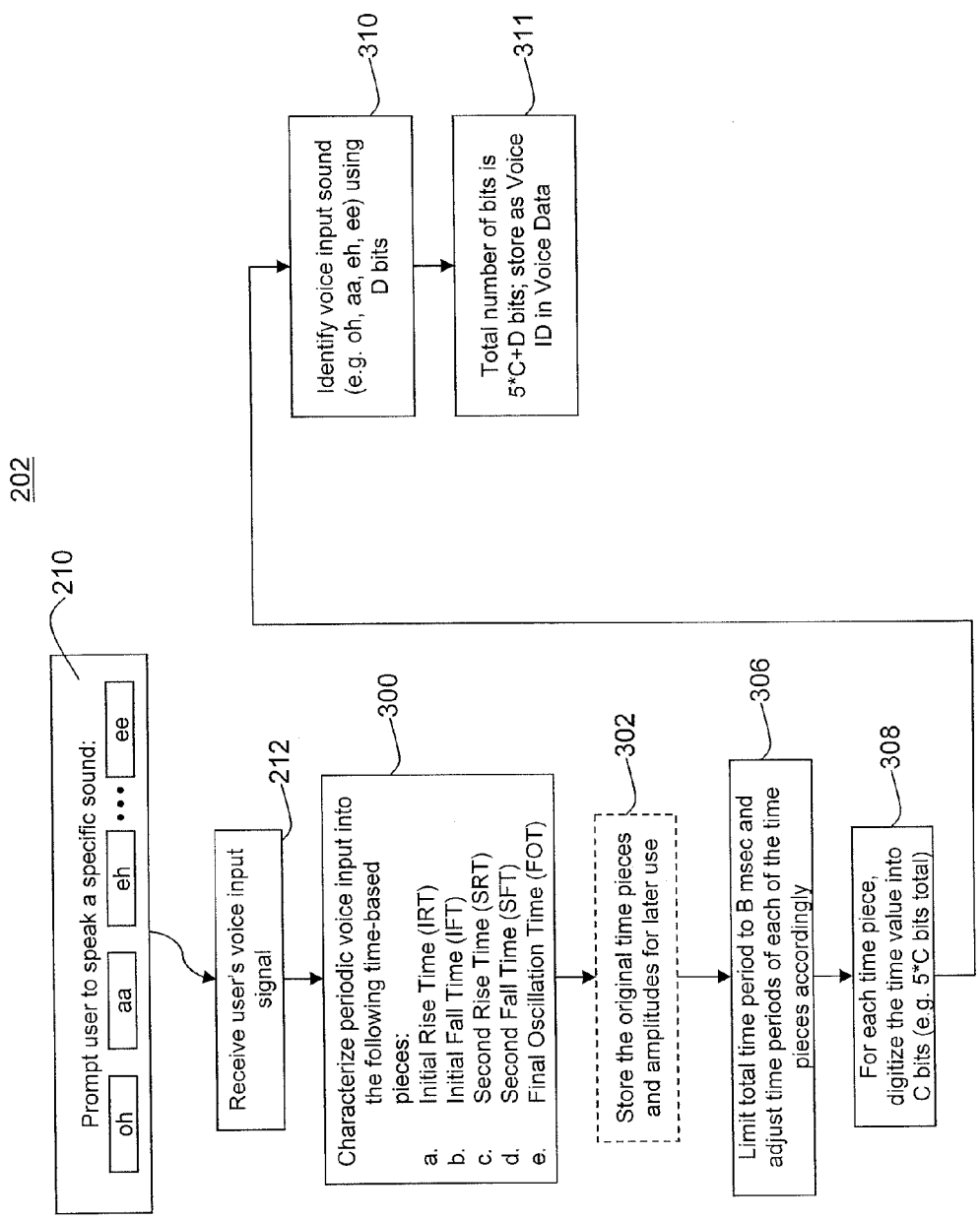
FIG. 11 is a flow chart illustrating exemplary computer executable instructions for generating a voice ID in the time domain.

Turning to FIG. 11, a time domain voice authentication scheme 202 is provided, which includes the mobile device 10 prompting the user to speak or utter a specific sound, for example, any one of "oh", "aa", "eh" or "ee", as per block 210. As described above, other sounds or combinations thereof may be applicable to the principles described herein. The mobile device 10 receives the user's voice input signal, as per block 212.

Figure 12:
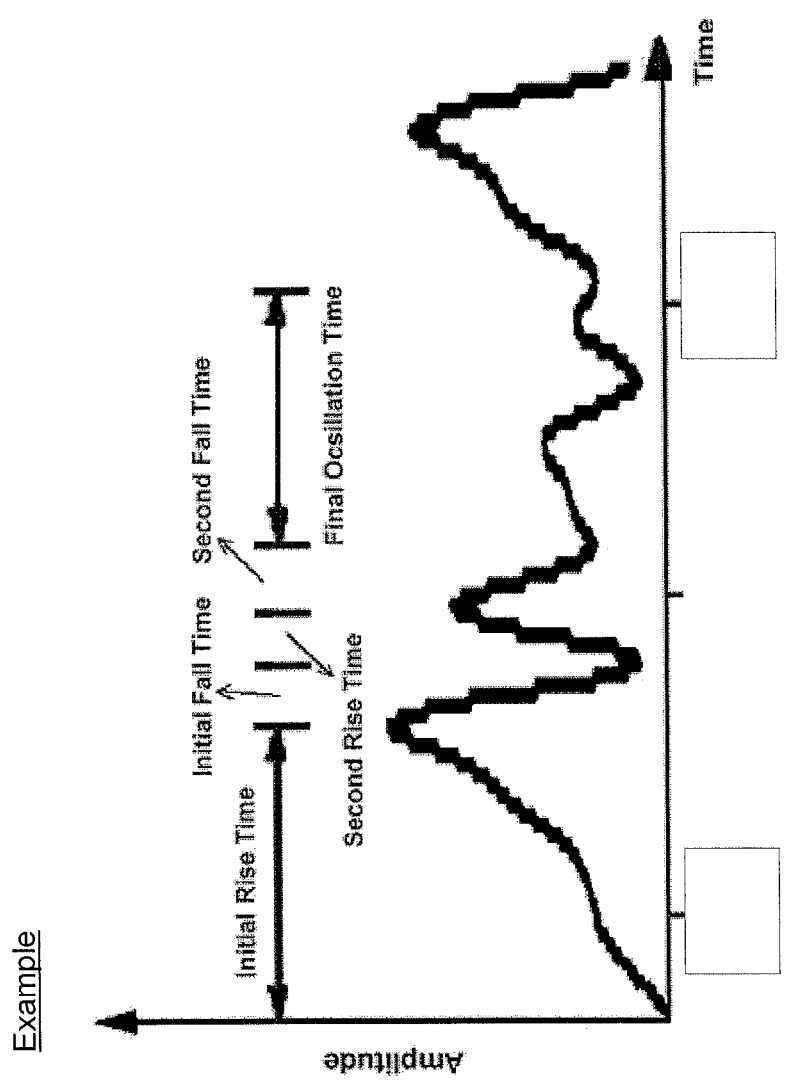
FIG. 12 is an exemplary illustration of a time domain graph showing different time components.

The voice signal in the time domain is then characterized into one or more time-based portions, also called pieces or components, as per block 300. In particular, one or more periods of the voice signal input are sampled to measure the time value of each of the IRT, IFT, SRT, SFT and FOT portions. These time portions are shown in the time domain graph of single period in FIG. 12. As can be seen, a period of a voice generally includes two or more peaks. The IRT and IFT measure the time value or duration of the first peak, while the SRT and SFT measure the time duration of the second peak. The FOT measures the remainder of the signal after the second peak. The amplitudes of each of the five time portions are also measured. These five time portions or pieces are specific to the user's voice and are used to identify or authenticate the user.

Turning back to FIG. 11, after the five different time portions of the voice's period have been measured in time and amplitude, at block 302, the measurements may be optionally stored in the voice data database 30 for later use. For example, the original measurements may be collected over time for a user and then used for trend analysis of the user's voice.

Then, at block 306, the time domain authentication scheme 202 limits or sets the time period to B msec. The time periods of each the time portions, namely IRT, IFT, SRT, SFT and FOT, are adjusted accordingly to fit within the time period of B msec. In particular, the sum of the five time portions is equal to B msec. For example, the original time values of IRT, IFT, SRT, SFT and FOT are 4 msec, 2 msec, 2 msec, 2 msec and 2 msec, respectively, and the parameter B is set to 6 msec. Thus, the adjusted time values for IRT, IFT, SRT, SFT and FOT are 2 msec, 1 msec, 1 msec, 1 msec and 1 msec, respectively. It can thus be appreciated that the time duration of each time portion is adjusted so that the relative time durations when compared one another remain the same when the time period is adjusted to B msec.

It can be appreciated that block 306 advantageously reshapes the voice signal so that it is comparable with other voices. As described earlier, adjusting the time period accounts for the different variations in the user's pitch. Thus, although the user may speak or utter "oh" in a quiet and lower-pitched voice in one instance, the time domain authentication scheme 202 can still recognize the same user's voice if the same user speaks or utters "oh" in a loud and higher-pitched voice in another instance.

Continuing with FIG. 11, after the time and amplitude have been reshaped, at block 308, the length of time for each time piece is digitized into C bits. For example, the time value for the IRT is digitized in $C_{IRT}$ bits, and similarly, the IFT is digitized into $C_{IFT}$ bits. Along such lines, the bits are concatenated to form $C_{IRT}$-$C_{IFT}$-$C_{SRT}$-$C_{SFT}$-$C_{FOT}$. Thus, there are 5*C bits formed from the time portions.

At block 310, the type of voice input sound or tone is represented using D bits. Then, as per block 312, the values are concatenated to form a bit string with a total of 5*C+D bits. It can be understood that the voice ID generated from the time domain voice authentication scheme 202 comprises the bit string outputted from block 311. In particular, the voice ID comprises $C_{RT}$-$C_{IFT}$-$C_{SRT}$-$C_{SFT}$-$C_{FOT}$-D. The order of the bit segments can be arranged in various ways, as long as the arrangements of the bits are identifiable and can be used to compare with other voice IDs.

Figure 13:
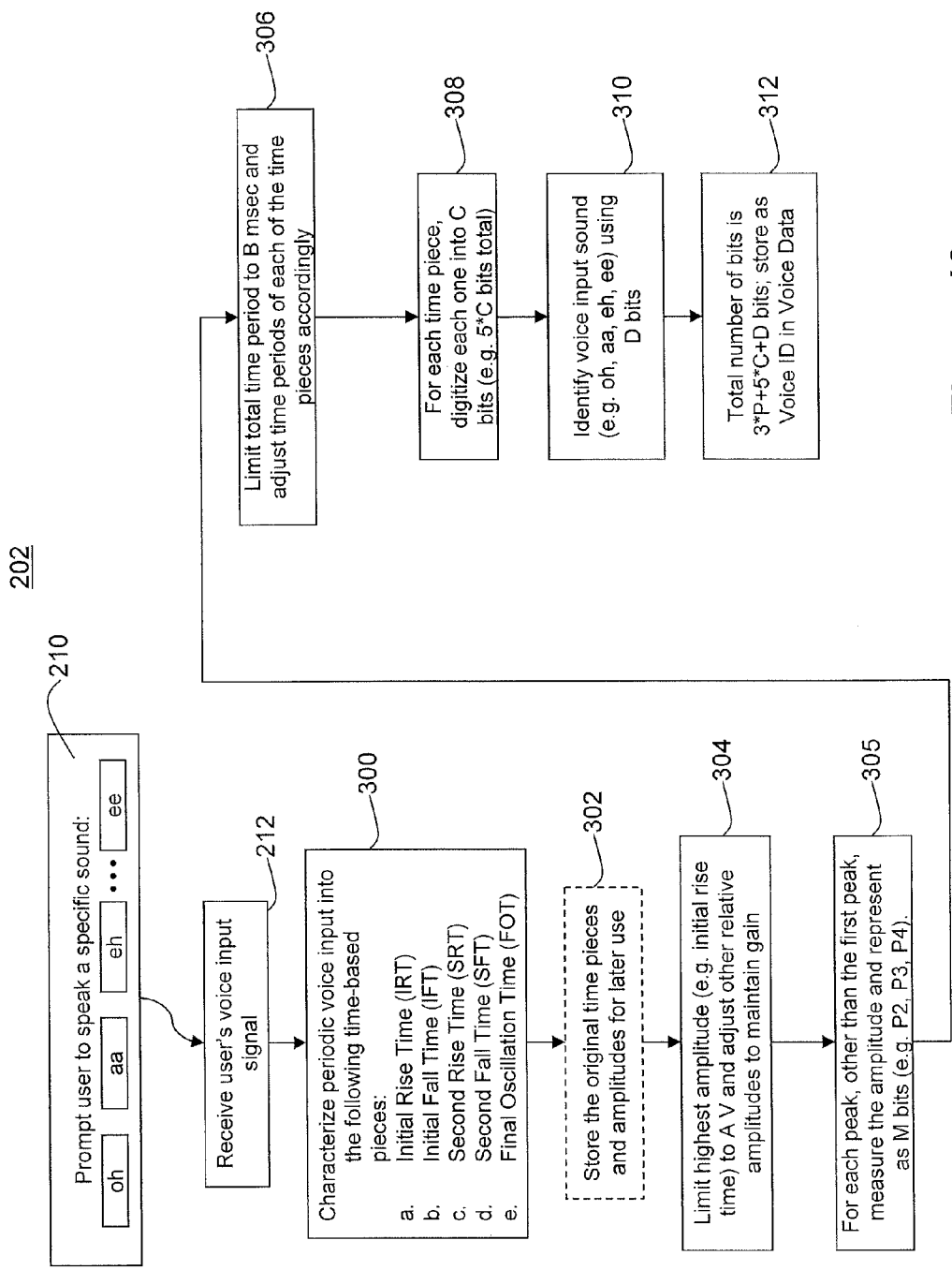
FIG. 13 is a flow chart illustrating another embodiment of generating a voice ID in the time domain.

Figure 13 shows another embodiment of a time domain voice authentication scheme 202 similar to the embodiment described with respect to FIG. 11. However, after the voice input is characterized into the five different time portions, namely IRT, IFT, SRT, SFT, and FOT, as per block 300, the amplitude of the data is then reshaped so that different instances of the voice input are comparable, if they are from the same user. Following block 300 is block 304, whereby the highest amplitude of any one of the time portions is set to A Volts, and the amplitudes of the other time portions are adjusted accordingly in order to maintain a relative gain. Typically, the IRT has the highest amplitude and, thus, the amplitudes of the IFT, SRT, SFT and FOT are adjusted to maintain a relative gain to the IRT. For example, if the IRT had an amplitude of 4 Volts, the SRT had an amplitude of 2 Volts, and the parameter A Volts=2 Volts, then, the IRT amplitude will be set to 2 Volts and the SRT amplitude will be set to 1 Volt.

Figure 15:
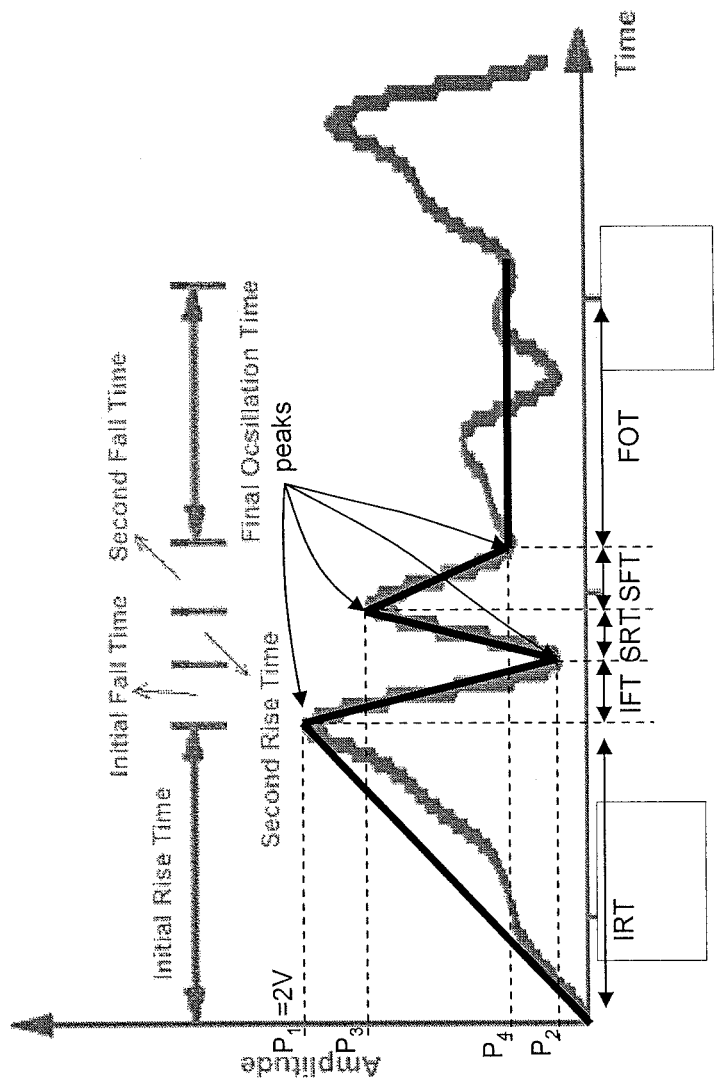
FIG. 15 is an exemplary illustration of a time domain graph showing different time components and peak amplitudes.

Continuing with FIG. 13, after block 304 is block 305, the amplitudes of the upper and lower peaks are measured and recorded. Turning to FIG. 15, for example, a time domain graph is shown. The voice signal is approximated according to straight lines between the peaks, which are indicated on the graph. It can be appreciated that the peaks may be referred to as local maxima and minima. A first peak created by the IRT is set to 2V and thus, it does not need to be recorded. A second peak defined by the IFT and SRT, the third peak defined by the SRT and SFT, and the fourth peak defined by the SFT and FOT are variable depending on the user's voice and are measured as $P_2$, $P_3$ and $P_4$, respectively. In particular the amplitudes of these peaks, typically given in units of Volts, are converted in bits. That is each of $P_2$, $P_3$ and $P_4$ are represented as a certain number of bits.

After carrying out block 305, the time domain signal is then processed according to blocks 306, 308, 310 and 312 as described above with respect to FIG. 11. However, block 312 in FIG. 13 includes a total of 3*P+5*C+D bits to generate the voice ID. It can be appreciated that this voice ID includes data related to the amplitude of the voice signal as well as the time periods of each time portion.

Figure 14:
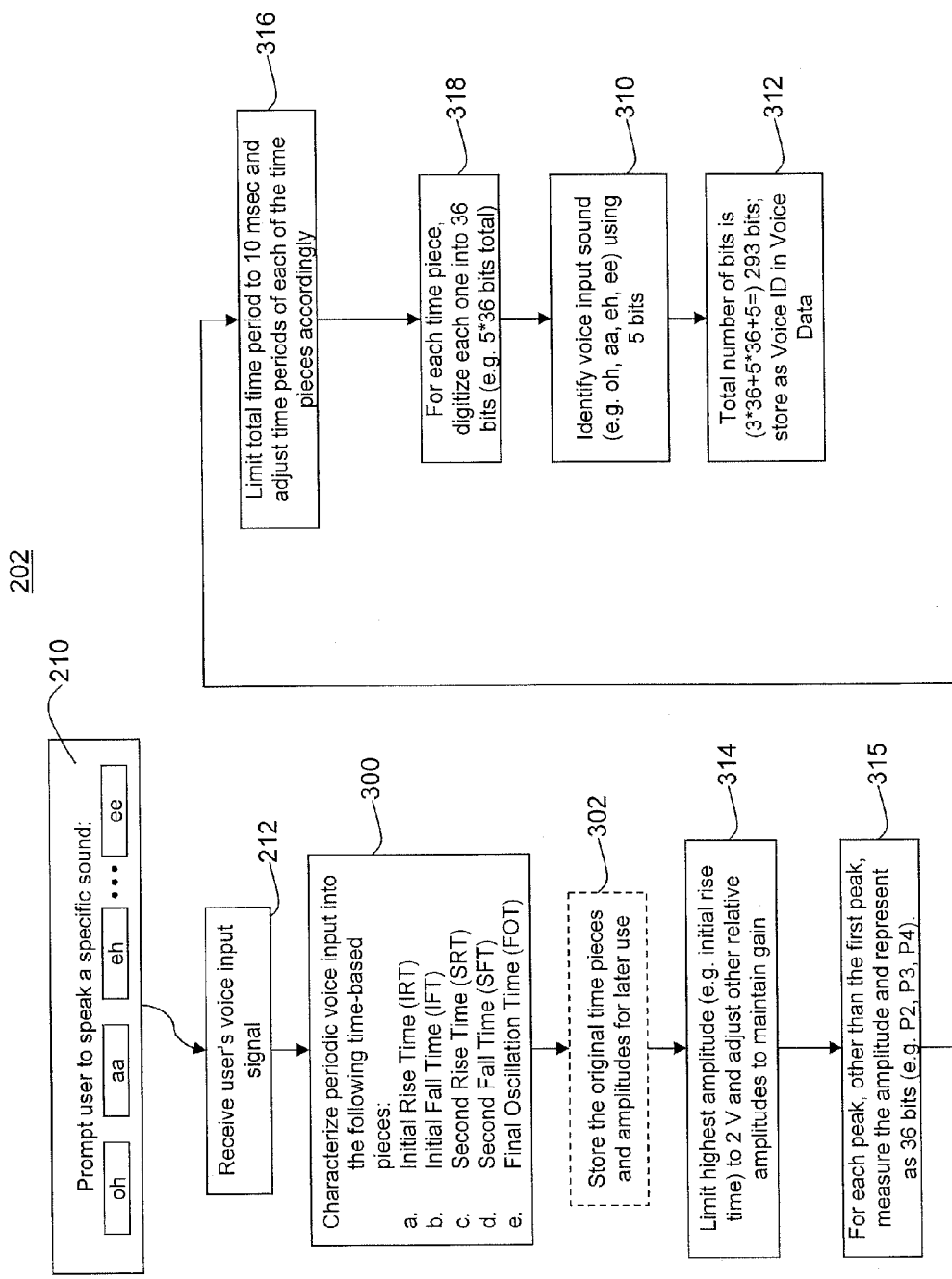
FIG. 14 is a flow chart illustrating another embodiment of generating a voice ID in the time domain according to the flow chart in FIG. 13.

FIG. 14 shows an example embodiment of the time domain voice authentication scheme 202 as described in FIG. 13. Blocks 210, 212, 300 and 302 are identical to those described with respect to FIG. 13. Turning to block 314, the authentication scheme 202 sets the amplitude of the time portion, or piece, with the highest amplitude to 2 Volts (e.g. a specified value of the parameter A Volts). The amplitudes of the other time portions are adjusted accordingly to maintain the relative gain to the highest amplitude, namely 2 Volts. At block 315, the amplitudes of the three peaks, excluding the first peak, is measured, whereby the amplitude of each peak is represented by 36 bits. Therefore, since there are three peaks, a total of 108 bits are used to represent the amplitudes of the peaks. At block 316, the length of a period is set to 10 msec (e.g. a specified value of the parameter B msec) and the time lengths of the other time portions (e.g. IRT, IFT, SRT, SFT and FOT) are adjusted accordingly to fit within the allotted period of 10 msec. It is noted that the relative length of time between each of the five time portions remains the same. At block 318, each time piece is digitized into 36 bits (e.g. a specified value of the parameter C bits). Thus, the concatenated bits, having a sum of 180 bits, are used to represent the five time portions. At block 320, 5 bits (e.g. a specified value of the parameter D bits) are used to represent which type of voice input tone or sound was used.

Therefore, in view of the above, the 108 bits that represent the amplitudes of the peaks, the 180 bits that represent the time portions and the 5 bits that represent the specific type of sound are concatenated to form a 293 bit string. The voice ID generated from the time domain voice authentication scheme 202 comprises the 293 bit string.

The time domain voice authentication scheme 202 does not require the DFT process, nor the computing resources to implement the same, in order to convert the voice signal from a time domain to a frequency domain. In this aspect, using the time domain voice authentication scheme 202 decreases the computing resources used to identify or authenticate a user's voice.

It can be seen that the parameters set out with respect to FIG. 13 are specified in the exemplary embodiment in FIG. 14. The below table maps these parameter values:

| Time Domain Voice Authentication Parameter | Example Value |
|---|---|
| A Volts | 2 Volts |
| P bits (for each peak) | 36 bits |
| B msec | 10 Volts |
| C bits (for each time portion) | 36 bits |
| D bits (for voice input sound) | 5 bits |

Other sets of parameters may also be used and adjusted according to the desired application. For example, each user may have a different set of parameter values to highlight certain characteristics of the voice. These various sets of parameters are stored in the authentication settings database 32 and can be retrieved and applied to the time domain voice authentication scheme 202.

Figure 16:
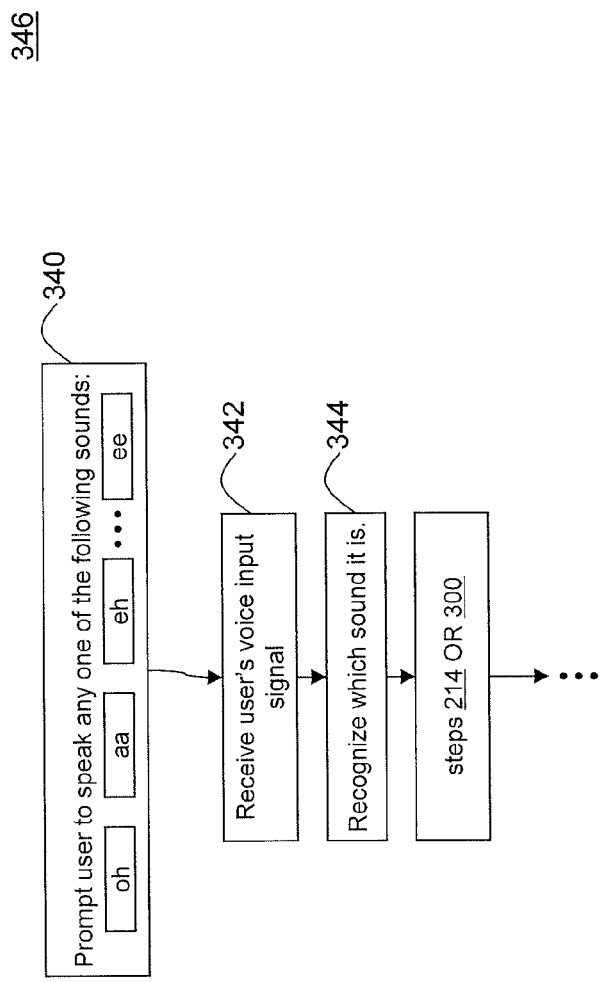
FIG. 16 is a flow chart of another method for determining the type of vocal sound for use in generating a voice ID in either the frequency domain or time domain.

Turning to FIG. 16, an alternate series of blocks (e.g. 340, 342, 344) are provided in place of blocks 210 and 212, as previously discussed with respect to FIGS. 5, 7, 8, 11, 13 and 14. In particular, at block 340, the mobile device 10 prompts the user to speak any one of the following sounds or tones: "oh", "aa", "eh" and "ee". Other sounds may also be used. At block 342, the mobile device 10 receives the user's voice input signal. Then, as per block 344, the mobile device 10 determines which of the sounds or tones were uttered using speech recognition. After which one of the tones or sounds was spoken or uttered, then the voice authentication scheme continues. For example, for the frequency domain voice authentication scheme 200, the next block would be 214. For the time domain voice authentication scheme, the following block would be 300. It can be appreciated that the alternate embodiment shown in FIG. 16 has the perceived advantage to allow a user to utter any sound or tone, rather than being limited to a sound or tone specified by the voice authentication application 50.

Figure 17:
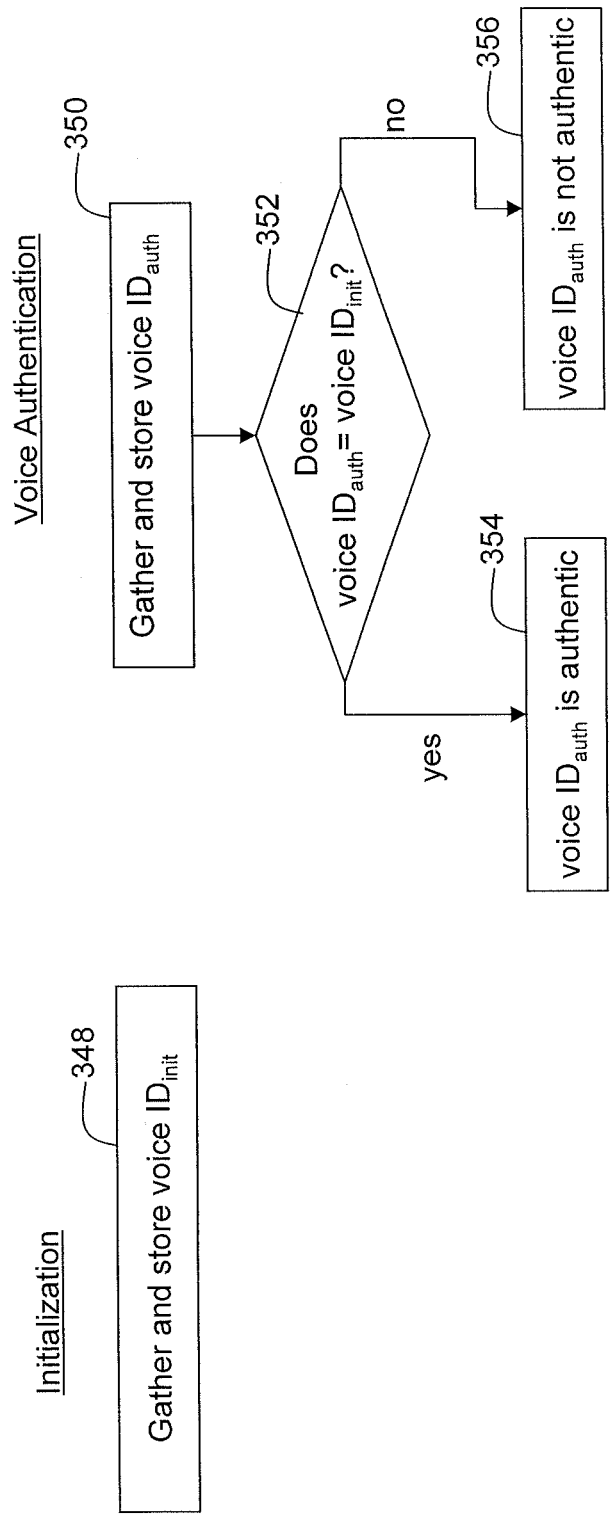
FIG. 17 is a flow chart illustrating exemplary computer executable instructions for authenticating a voice using the voice ID generated in either the frequency domain or time domain.

Turning to FIG. 17, a general initialization and, voice authentication process are shown. In the initialization process, the mobile device 10 generates the voice $ID_{init}$ by implementing either the frequency domain voice authentication scheme 200 or the time domain voice authentication scheme 202. It can be readily understood that either of the schemes 200, 202 is able to generate a voice ID. The voice $ID_{init}$ is stored into the voice data database 30 and is associated with a certain user's identity.

When the user, for example, the same user, wishes to authenticate his voice, at block 350, the mobile device 10 generates a voice $ID_{auth}$ using the same voice authentication scheme and settings as those used to generate the voice $D_{init}$. For example, if the voice $ID_{init}$ was generated using an "oh" sound and the frequency domain voice authentication scheme 200, then the voice $ID_{auth}$ must be generated using an "oh" sound and the frequency domain authentication scheme 200. In this way, the generated voice $ID_{init}$ and voice $ID_{auth}$ are considered comparable.

Continuing with FIG. 17, at block 352, the voice authentication application 50 determines if the voice $ID_{init}$ is equal to voice $ID_{auth}$. If so, then voice $ID_{auth}$ is considered authentic (block 354). If not, then voice $ID_{auth}$ is not considered authentic (block 356). It can be appreciated that the comparison of the two voice IDs at block 352 need not necessarily be limited to identical bit values, and may include 'similar enough' comparisons. Voice IDs may be considered equal if they are similar enough. For example, there may be thresholds that are used to identify if the voice IDs are similar enough to conclude that the voice $ID_{init}$ and voice $ID_{auth}$ are equal. In one embodiment, a threshold limit is set to 96% similarity to take into account the microphone sensitivity and background noise.

Figure 18:
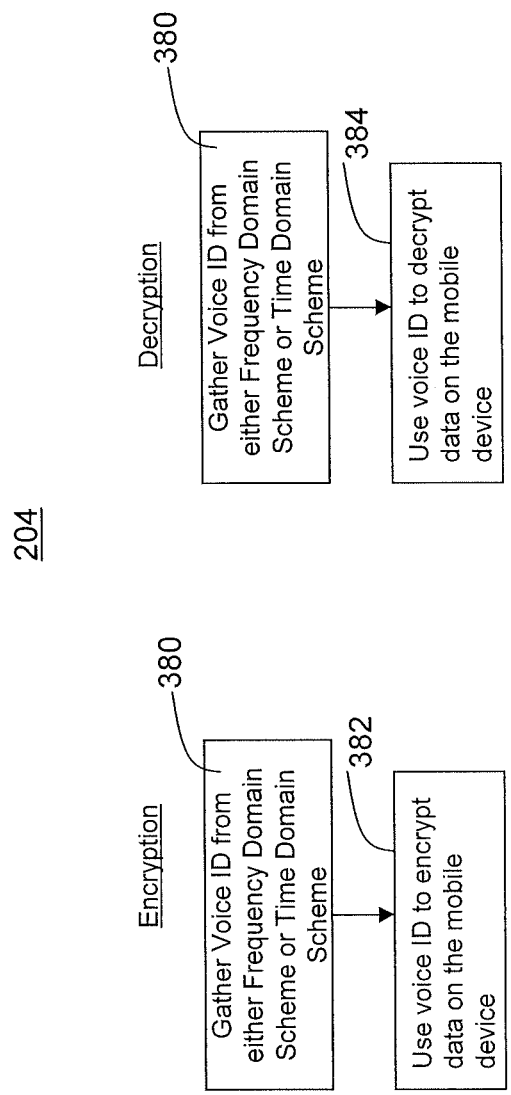
FIG. 18 is a flow chart illustrating exemplary computer executable instructions for encryption using voice ID.

Turning to FIG. 18, it can be appreciated that the voice IDs generated from either one of the frequency domain or time domain authentication schemes 200, 202, can be used to encrypt data. In particular, at block 380, the voice ID is generated according to any one of the schemes 200, 202. At block 382, the voice ID is used as a digital signature to encrypt data according to any applicable encryption scheme, such as RSA, ECDSA, DSA, etc. In another example embodiment, the voice ID gathered from block 380 can be used to decrypt data (block 384).

Figure 19:
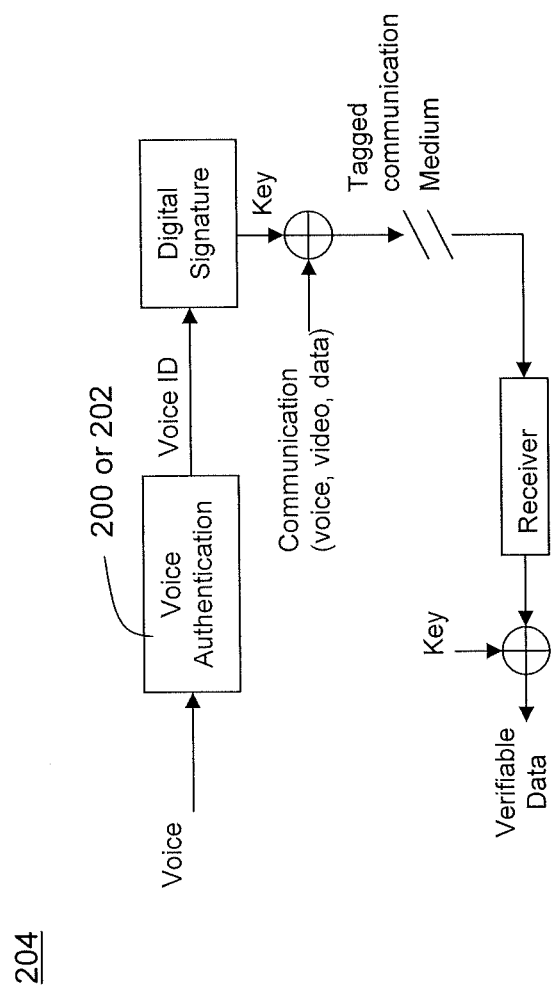
FIG. 19 is a block diagram illustrating the flow of data for using a voice ID as a digital signature.

In particular, according to FIG. 19, the voice input is used to generate a voice ID as per the authentication schemes 200, 202. The voice ID is used as digital signature to generate a key that is used to sign or tag various communications from the mobile device 10, such as voice, video, email, etc. The communication, which is signed according to the voice ID, is sent to another entity. The same digital signature is required to verify the signature.

Figure 20:
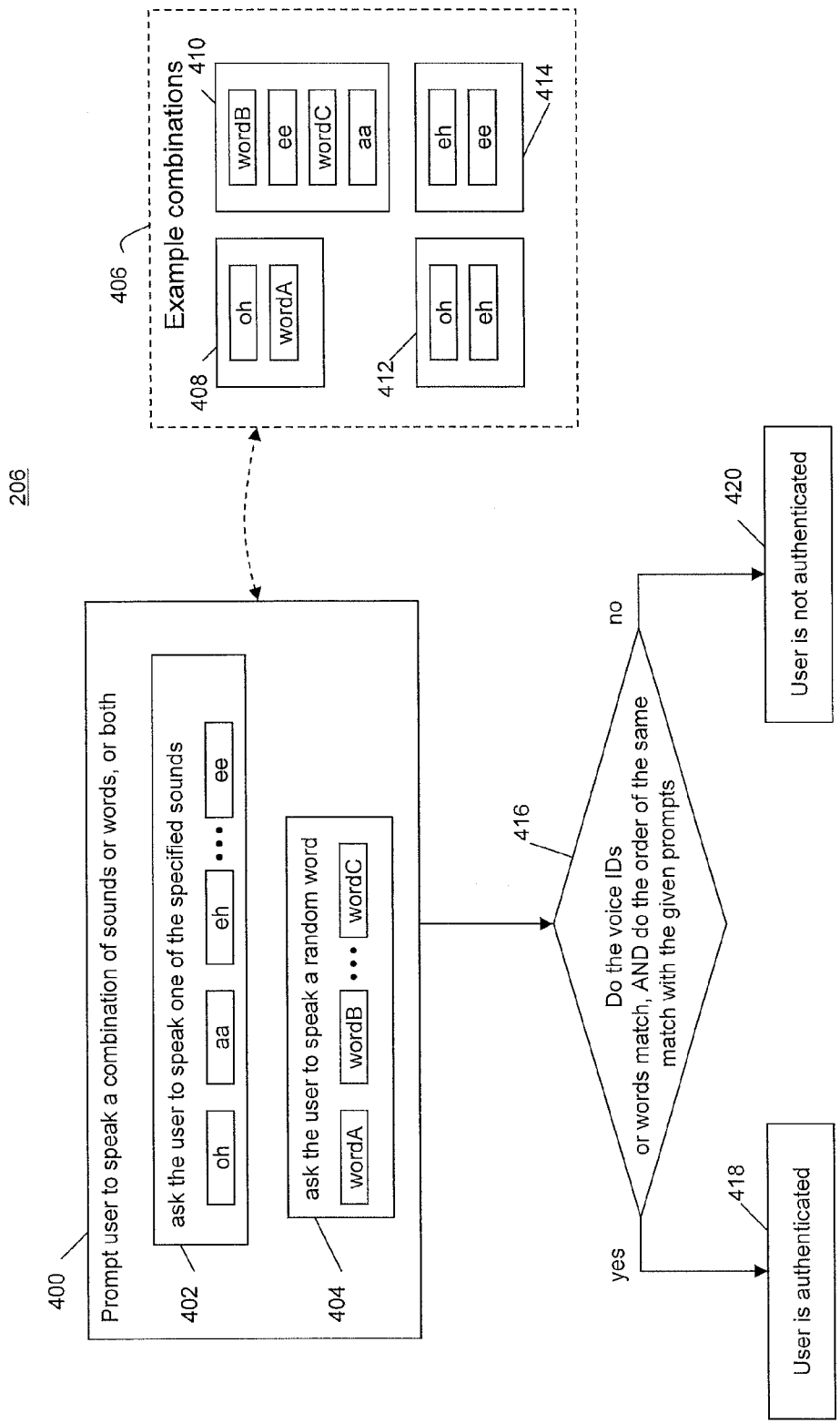
FIG. 20 is a flow chart illustrating exemplary computer executable instructions for a two-level password scheme using voice ID.

Turning to FIG. 20, the voice IDs can also be used in combination with a multi-level password scheme 206. In order for a user to access a certain file or application (e.g. emails 138, IT policy module 146, pictures, entries in an address book 56, etc.), the user must provide a correct password, such as a spoken password. However, it is known that in some cases a spoken password can be copied by an audio recorder, whereby an attacker can replay the recorded spoken password to gain access to a file. Thus, the multi-level password scheme 206 is provided to mitigate such attacks.

By way of background, it is appreciated that the user's voice ID for different sounds and words, as well as different schemes (e.g. 200, 202) must be stored beforehand into the voice data database 30. In this way, any spoken sounds or words can be compared against those sounds or words recorded earlier.

At block 400, the mobile device 10 prompts the user to speak or utter a combination of sounds or words, or both. The sounds or words are randomly selected from the voice data database 30 that have recorded earlier, and are selected in a random order and number. As per block 402, the mobile device 10 may prompt the user to speak one of the tonal sounds, for which a voice ID is available, as per the frequency domain voice authentication scheme 200, or the time domain voice authentication scheme 202. As per block 404, the mobile device 10 prompts the user to speak or utter a word selected randomly from the voice data database 30. It can be appreciated that the user's voice signal for the words have been recorded earlier and stored in the voice data database 30. Example words may include "car", "jump", "blue", "rabbit", etc. It can be appreciated that blocks 402 and 404 may be repeated any number of times in a random fashion.

Example combinations 406 of the different prompts are provided. In one combination 408, the user is asked to speak or utter the password "oh" followed by "word A". In another combination 410, the user is asked to speak or utter the password "word B"-"ee"-"word C"-"aa". In yet another combination 412, the user is prompted to speak the password "oh"-"eh". Similarly, in another combination 414, the user is prompted to speak the password "eh"-"ee". It can be readily understood that many different combinations can be generated.

At block 416, the voice authentication application 50 determines if the voice signals match the combination of sounds or words provided. For example, if, at block 400, the mobile device 10 prompted the user to speak or utter the combination 412, then the user would speak or utter "oh"-"eh". The voice IDs for "oh" and "eh" for the user would have been stored earlier in the voice data database 30, whereby the voice ID for "oh" was generated according to the frequency domain scheme 200 and the voice ID for "eh" was generated according to the time domain scheme 202. That is, there would be a voice $ID_{initOH}$ and a voice $ID_{initEH}$. When the user speaks the random combination of sounds, the voice authentication protocol separates the combination of sounds into its components (e.g. "oh" and "eh") and applies the corresponding voice authentication scheme, namely the frequency domain scheme 200 for the "oh" signal and the time domain scheme 202 for the "eh" signal. In this way the values for the voice $ID_{authOH}$ and voice $ID_{authEH}$ are generated. If the spoken password values (e.g. the concatenation of voice $ID_{authOH}$ and voice $ID_{authEH}$) match the stored password (e.g. the concatenation of voice $ID_{initOH}$ and voice $ID_{initEH}$), then the password is accepted and the user is authenticated, as per block 418. If not, then the spoken password is rejected that the user is not authenticated, as per block 420.

It can thus be seen that both the values of the spoken components must be correct, as well as the order in which the components are spoken. This reduces the risk of an attacker recording a user speaking the password, and then replaying the recording back to overcome the voice-based password system.

It can be appreciated the voice IDs generated from either the frequency domain authentication scheme 200 or time domain authentication scheme 202 may be used in various ways to authenticate a user's voice.

Although the above has been described with reference to certain specific embodiments, various modifications thereof will be apparent to those skilled in the art without departing from the scope of the claims appended hereto.

The invention claimed is:

1. A method of generating a voice identification comprising:
   a processor transforming one or more periods of a voice signal from a time domain to a frequency domain;
   setting an amplitude of a first harmonic to a first amplitude and adjusting each amplitude of one or more other harmonics to maintain relative gain to said first harmonic;
   setting a frequency of said first harmonic of said transformed voice signal to a first frequency and adjusting each frequency of one or more other harmonics to maintain harmonic series relative to said first harmonic;
   filtering said transformed voice signal, the filtered transformed voice signal comprising one or more remaining harmonics;
   digitizing the amplitude of each of said one or more remaining harmonics into a first number of bits;
   digitizing the number of said one or more remaining harmonics into a second number of bits;
   concatenating said first number of bits and said second number of bits to form said voice identification data; and
   storing said voice identification.

2. The method of claim 1 further comprising using the voice authentication data in a multi-level password scheme.

3. The method of claim 1 further comprising using the voice authentication scheme in a signature encryption scheme.

4. The method of claim 1 further comprising determining additional voice data is necessary and prompting for an additional voice signal using a visual prompt or an audio prompt.

5. The method of claim 1 further comprising storing unprocessed frequency and amplitude information of the first harmonic in a voice database.

6. The method of claim 5 further comprising processing the unprocessed information for computing trends and correlations in voice data.

7. The method of claim 1 wherein the voice signal is characterized by a plurality of segments.

8. The method of claim 7 wherein each of the segments are associated with a minimum time duration.

9. A non-transitory computer readable medium comprising computer executable instructions for generating a voice identification in a frequency domain, said computer readable medium comprising instructions for:
   transforming one or more periods of a voice signal from a time domain to said frequency domain;
   setting an amplitude of a first harmonic to a first amplitude and adjusting each amplitude of one or more other harmonics to maintain relative gain to said first harmonic;
   setting a frequency of said first harmonic of said transformed voice signal to a first frequency and adjusting each frequency of one or more other harmonics to maintain harmonic series relative to said first harmonic;
   filtering said transformed voice signal, including removing one or more frequency components that are above a threshold harmonic, the filtered transformed voice signal comprising one or more remaining harmonics;
   digitizing the amplitude of each of said one or more remaining harmonics into a first number of bits;
   digitizing the number of said one or more remaining harmonics into a second number of bits; and,
   concatenating said first number of bits and said second number of bits to form said voice identification; and
   storing voice identification.

10. The non-transitory computer readable medium in claim 9 further comprising using the voice authentication data in a multi-level password scheme.

11. The non-transitory computer readable medium in claim 9 further comprising using the voice authentication scheme in a signature encryption scheme.

12. The non-transitory computer readable medium in claim 9 further comprising determining additional voice data is necessary and prompting for an additional voice signal using a visual prompt or an audio prompt.

13. The non-transitory computer readable medium in claim 9 further comprising storing unprocessed frequency and amplitude information of the first harmonic in a voice database.

14. The non-transitory computer readable medium in claim 13 further comprising processing the unprocessed information for computing trends and correlations in voice data.

15. The non-transitory computer readable medium in claim 9 wherein the voice signal is characterized by a plurality of measured segments.

16. The non-transitory computer readable medium in claim 15 wherein each of the segments are associated with a minimum time duration.

17. A mobile device for generating a voice identification in a frequency domain, said mobile device comprising a processor and a memory, said memory includes computer executable instructions for:
   using the processor for transforming one or more periods of a voice signal from a time domain to said frequency domain;
   setting an amplitude of a first harmonic to a first amplitude and adjusting each amplitude of one or more other harmonics to maintain relative gain to said first harmonic;
   setting a frequency of said first harmonic of said transformed voice signal to a first frequency and adjusting each frequency of one or more other harmonics to maintain harmonic series relative to said first harmonic;
   filtering said transformed voice signal, including removing one or more frequency components that are above a threshold harmonic, the filtered transformed voice signal comprising one or more remaining harmonics;
   digitizing the amplitude of each of said one or more remaining harmonics into a first number of bits;
   digitizing the number of said one or more remaining harmonics into a second number of bits;
   and,
   concatenating said first number of bits and said second number of bits to form said voice identification; and
   storing voice identification.

\* \* \* \* \*